US012113990B2

(12) United States Patent
Zhao et al.

(10) Patent No.: US 12,113,990 B2
(45) Date of Patent: Oct. 8, 2024

(54) METHOD AND APPARATUS FOR VIDEO CODING

(71) Applicant: Tencent America LLC, Palo Alto, CA (US)

(72) Inventors: Xin Zhao, San Diego, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/446,065

(22) Filed: Aug. 26, 2021

(65) Prior Publication Data

US 2021/0392345 A1 Dec. 16, 2021

Related U.S. Application Data

(63) Continuation of application No. 16/838,755, filed on Apr. 2, 2020, now Pat. No. 11,172,211.

(Continued)

(51) Int. Cl.
*H04N 19/186* (2014.01)
*H04N 19/176* (2014.01)
(Continued)

(52) U.S. Cl.
CPC ......... *H04N 19/186* (2014.11); *H04N 19/176* (2014.11); *H04N 19/184* (2014.11); *H04N 19/61* (2014.11)

(58) Field of Classification Search
CPC .................... H04N 19/186; H04N 19/176
See application file for complete search history.

(56) References Cited

U.S. PATENT DOCUMENTS

| 8,526,495 | B2 * | 9/2013 | Liu | ........................ | H04N 19/96 |
| | | | | | 375/240.12 |
| 9,049,452 | B2 * | 6/2015 | Liu | ...................... | H04N 19/463 |

(Continued)

FOREIGN PATENT DOCUMENTS

| CN | 108141597 A | 6/2018 |
| CN | 109076243 A | 12/2018 |

(Continued)

OTHER PUBLICATIONS

PCT International Search Report and Written Opinion issued in Application PCT/US 20/26578 on Aug. 17, 2020, 17 pages.

(Continued)

*Primary Examiner* — Irfan Habib
(74) *Attorney, Agent, or Firm* — ARENTFOX SCHIFF LLP

(57) ABSTRACT

Aspects of the disclosure provide methods and apparatuses for video encoding/decoding. Processing circuitry in an apparatus decodes coded information of a coding unit (CU) from a coded video bitstream. The coded information indicates a last position of non-zero transform coefficients of a first coding block (CB) of the CU. The processing circuitry determines whether a secondary transform index is signaled in the coded information based at least on comparison to a threshold value and whether to perform a secondary transform on a second CB of the CU based on whether the secondary transform index is determined to be signaled in the coded information. When the secondary transform is determined to be performed, the processing circuitry performs the secondary transform on the second CB and reconstructs the second CB. When the secondary transform is determined not performed, the second CB is reconstructed without performing the secondary transform on the second CB.

12 Claims, 33 Drawing Sheets

Related U.S. Application Data

(60) Provisional application No. 62/829,435, filed on Apr. 4, 2019.

(51) Int. Cl.
*H04N 19/184* (2014.01)
*H04N 19/61* (2014.01)

(56) References Cited

U.S. PATENT DOCUMENTS

| | | | | |
|---|---|---|---|---|
| 9,769,472 | B2* | 9/2017 | Liu | H04N 19/122 |
| 10,491,914 | B2* | 11/2019 | Zhao | H04N 19/184 |
| 10,567,801 | B2* | 2/2020 | Zhao | H04N 19/61 |
| 10,630,974 | B2* | 4/2020 | He | H04N 19/169 |
| 11,025,909 | B2* | 6/2021 | Zhao | H04N 19/11 |
| 11,172,211 | B2* | 11/2021 | Zhao | H04N 19/184 |
| 11,533,508 | B2* | 12/2022 | Lee | H04N 19/132 |
| 11,563,937 | B2* | 1/2023 | Koo | H04N 19/423 |
| 11,570,478 | B2* | 1/2023 | Jung | H04N 19/119 |
| 11,616,966 | B2* | 3/2023 | Chiang | H04N 19/105 |
| | | | | 375/240.26 |
| 11,695,960 | B2* | 7/2023 | Nalci | H04N 19/61 |
| | | | | 382/248 |
| 2016/0029039 | A1* | 1/2016 | Jeong | H04N 19/12 |
| | | | | 375/240.16 |
| 2016/0219290 | A1* | 7/2016 | Zhao | H04N 19/12 |
| 2017/0094313 | A1* | 3/2017 | Zhao | H04L 43/16 |
| 2017/0094314 | A1 | 3/2017 | Zhao et al. | |
| 2017/0324643 | A1* | 11/2017 | Seregin | H04N 19/132 |
| 2018/0020218 | A1* | 1/2018 | Zhao | H04N 19/12 |
| 2018/0332289 | A1* | 11/2018 | Huang | H04N 19/96 |
| 2019/0356915 | A1* | 11/2019 | Jang | H04N 19/176 |
| 2019/0387241 | A1* | 12/2019 | Kim | H04N 19/46 |
| 2020/0204833 | A1* | 6/2020 | Egilmez | H04N 19/176 |
| 2020/0260078 | A1* | 8/2020 | Zhao | H04N 19/12 |
| 2020/0374531 | A1* | 11/2020 | Zhao | H04N 19/105 |
| 2020/0404276 | A1* | 12/2020 | Nalci | H04N 19/649 |
| 2021/0014534 | A1* | 1/2021 | Koo | H04N 19/132 |
| 2021/0076070 | A1* | 3/2021 | Jung | H04N 19/70 |
| 2022/0007013 | A1* | 1/2022 | Zhu | H04N 19/117 |
| 2022/0070494 | A1* | 3/2022 | Koo | H04N 19/176 |
| 2022/0159300 | A1* | 5/2022 | Chiang | H04N 19/70 |
| 2022/0201335 | A1* | 6/2022 | Chiang | H04N 19/159 |
| 2022/0345744 | A1* | 10/2022 | LeLeannec | H04N 19/11 |

FOREIGN PATENT DOCUMENTS

| | | |
|---|---|---|
| EP | 3764649 A1 | 1/2021 |
| WO | WO 2017/191782 A1 | 11/2017 |
| WO | WO 2018/128323 A1 | 7/2018 |
| WO | 2018166429 A1 | 9/2018 |
| WO | 2018188648 A1 | 10/2018 |

OTHER PUBLICATIONS

Supplementary European Search Report issued Dec. 16, 2022 in Application No. 20783117.3, pp. 1-22.

Siekmann M et al: "CE6-related: Simplification of the Reduced Secondary Transform", 14. JVET Meeting; Mar. 19, 2019-Mar. 27, 2019; Geneva; (The Joint Video Exploration Team of ISO/IEC JTC1/SC29/WG11 and ITU-T SG.16 ), No. JVET-N0555, Mar. 24, 2019, pp. 1-9.

Koo M et al: "CE6: Reduced Secondary Transform (RST) (CE6-3.1)", 14. JVET Meeting; Mar. 19, 2019-Mar. 27, 2019; Geneva; (The Joint Video Exploration Team of ISO/IEC JTC1/SC29/WG11 and ITU-T SG.16 ), No. JVET- N0193, Mar. 27, 2019, pp. 1-18.

Chen J et al: "Algorithm description for Versatile Video Coding and Test Model 4 (VTM 4)", 13. JVET Meeting; Jan. 9, 2019-Jan. 18, 2019; Marrakech; (The Joint Video Exploration Team of ISO/IEC JTC1/SC29/WG11 and ITU-T SG.16 ), No. JVET-M1002, Mar. 19, 2019, pp. 1-62.

Bross B et al: "Versatile Video Coding (Draft 4)", 13. JVET Meeting; Jan. 9, 2019-Jan. 18, 2019; Marrakech; (The Joint Video Exploration Team of ISO/IEC JTC1/SC29/WG11 and ITU-T SG.16 ), No. JVET-M1001, Mar. 17, 2019, pp. 1-300.

Nalci A et al: "Non-CE6: Combination of JVET-O0472 and JVET-O0569 for TU-level LFNST Signaling with Last Position Constraints", 15. JVET Meeting; Jul. 3, 2019-Jul. 12, 2019; Gothenburg; (The Joint Video Exploration Team of ISO/IEC JTC1/SC29/WG11 and ITU-T SG.16 ), No. JVET-O0963 Jul. 10, 2019, pp. 1-10.

C-W Hsu et al: "Description of SDR video coding technology proposal by MediaTek", 10. JVET Meeting; Apr. 10, 2018-Apr. 20, 2018; San Diego; (The Joint Video Exploration Team of ISO/IEC JTC1/SC29/WG11 and ITU-T SG.16), No. JVET-J0018, Apr. 11, 2018, pp. 1-64.

Jung J et al: "Non-CE6: Simplified LFNST signaling", 15. JVET Meeting; Jul. 3, 2019-Jul. 12, 2019; Gothenburg; (The Joint Video Exploration Team of ISO/IEC JTC1/SC29/WG11 and ITU-T SG.16 ), No. JVET-O0472; m48595, Jul. 11, 2019, pp. 1-5.

M-S Chiang et al: "CE6-related: Latency reduction for LFNST signaling", 15. JVET Meeting; Jul. 3, 2019-Jul. 12, 2019; Gothenburg; (The Joint Video Exploration Team of ISO/IEC JTC1/SC29/WG11 and ITU-T SG.16 ), No. JVET-O0293 ; m48403, Jun. 25, 2019, pp. 1-6.

Supplementary European Search Report issued Feb. 23, 2023 in Application No. 20783117.3, pp. 1-26.

Zhang K et al: "Non-CE6: Simplifications on LFNST", 15. JVET Meeting; Jul. 3, 2019-Jul. 12, 2019; Gothenburg; (The Joint Video Exploration Team of ISO/IEC JTC1/SC29/WG11 and ITU-T SG.16 ), No. JVET-O0266 ; m48376, Jun. 26, 2019.

Karam Naser et al: "Non-CE6: LFNST Up to 64×64 CU's", 16. JVET Meeting; Oct. 1, 2019-Oct. 11, 2019; Geneva; (The Joint Video Exploration Team of ISO/IEC JTC1/SC29/WG11 and ITU-T SG.16 ), No. JVET-P0354 ; m50321, Sep. 24, 2019.

1 Chinese Office Action issued Jul. 21, 2023 in Application No. 202080019613.3, pp. 1-28.

* cited by examiner

| | Descriptor |
|---|---|
| transform_unit( x0, y0, tbWidth, tbHeight, treeType ) { | |
|   if( treeType == SINGLE_TREE \|\| treeType == DUAL_TREE_LUMA ) | |
|     tu_cbf_luma[ x0 ][ y0 ] | ae(v) |
|   if( treeType == SINGLE_TREE \|\| treeType == DUAL_TREE_CHROMA ) { | |
|     tu_cbf_cb[ x0 ][ y0 ] | ae(v) |
|     tu_cbf_cr[ x0 ][ y0 ] | ae(v) |
|   } | |
|   if( | |
|   ( ( *CuPredMode[ x0 ][ y0 ] == MODE_INTRA* ) *&& sps_mts_intra_enabled_flag* ) \|\| | |
|   ( ( *CuPredMode[ x0 ][ y0 ] == MODE_INTER* ) *&& sps_mts_inter_enabled_flag* ) ) | |
|   *&& tu_cbf_luma[ x0 ][ y0 ] && treeType != DUAL_TREE_CHROMA* | |
|   *&& ( tbWidth <= 32 ) && ( tbHeight <= 32 ) }* | |
|     *cu_mts_flag[ x0 ][ y0 ]* | *ae(v)* |
|   if( tu_cbf_luma[ x0 ][ y0 ] ) | |
|     residual_coding( x0, y0, log2( tbWidth ), log2( tbHeight ), 0 ) | |
|   if( tu_cbf_cb[ x0 ][ y0 ] ) | |
|     residual_coding( x0, y0, log2( tbWidth / 2 ), log2( tbHeight / 2 ), 1 ) | |
|   if( tu_cbf_cr[ x0 ][ y0 ] ) | |
|     residual_coding( x0, y0, log2( tbWidth / 2 ), log2( tbHeight / 2 ), 2 ) | |
| } | |

*FIG. 9*

| | Descriptor |
|---|---|
| residual_coding( x0, y0, log2TbWidth, log2TbHeight, cIdx ) { | |
|   if( transform_skip_enabled_flag && ( cIdx != 0 \|\| cu_mts_flag[ x0 ][ y0 ] == 0 ) &&<br>    ( log2TbWidth <= 2 ) && ( log2TbHeight <= 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
| ...... | |

*FIG. 10A*

Continue from FIG. 10A

| | | | | | | | | | | | | |
|---|---|---|---|---|---|---|---|---|---|---|---|---|
| if( dep_quant_enabled_flag ) { | | | | | | | | | | | | |
|   QState = startQStateSb | | | | | | | | | | | | |
|   for( n = numSbCoeff - 1; n >= 0; n- - ) { | | | | | | | | | | | | |
|     xC = ( xS << log2SbSize ) +<br>    DiagScanOrder[ log2SbSize ][ log2SbSize ][ n ][ 0 ] | | | | | | | | | | | | |
|     yC = ( yS << log2SbSize ) +<br>    DiagScanOrder[ log2SbSize ][ log2SbSize ][ n ][ 1 ] | | | | | | | | | | | | |
|     if( sig_coeff_flag[ xC ][ yC ] ) | | | | | | | | | | | | |
|       TransCoeffLevel[ x0 ][ y0 ][ cIdx ][ xC ][ yC ] =<br>      ( 2 * AbsLevel[ xC ][ yC ] - ( QState > 1 ? 1 : 0 ) ) *<br>      ( 1 - 2 * coeff_sign_flag[ n ] ) | | | | | | | | | | | | |
|     QState = QStateTransTable[ QState ][ par_level_flag[ ] ] | | | | | | | | | | | | |
|   } else { | | | | | | | | | | | | |
|     sumAbsLevel = 0 | | | | | | | | | | | | |
|     for( n = numSbCoeff - 1; n >= 0; n- - ) { | | | | | | | | | | | | |
|       xC = ( xS << log2SbSize ) +<br>      DiagScanOrder[ log2SbSize ][ log2SbSize ][ n ][ 0 ] | | | | | | | | | | | | |
|       yC = ( yS << log2SbSize ) +<br>      DiagScanOrder[ log2SbSize ][ log2SbSize ][ n ][ 1 ] | | | | | | | | | | | | |
|       if( sig_coeff_flag[ xC ][ yC ] ) { | | | | | | | | | | | | |

FIG. 10B

*Continue from FIG. 10B*

| | | | | | | | | | |
|---|---|---|---|---|---|---|---|---|---|
| | | | | | | | | | |
| TransCoeffLevel[ x0 ][ y0 ][ cIdx ][ xC ][ yC ] = AbsLevel[ xC ][ yC ] * ( 1 − 2 * coeff_sign_flag[ n ] ) | | | | | | | | | |
| if( signHidden ) { | | | | | | | | | |
|   sumAbsLevel += AbsLevel[ xC ][ yC ] | | | | | | | | | |
|   if( ( n == firstSigScanPosSb ) && ( sumAbsLevel % 2 ) == 1 ) ) | | | | | | | | | |
|     TransCoeffLevel[ x0 ][ y0 ][ cIdx ][ xC ][ yC ] = −TransCoeffLevel[ x0 ][ y0 ][ cIdx ][ xC ][ yC ] | | | | | | | | | |
| } | | | | | | | | | |
| } | | | | | | | | | |
| } | | | | | | | | | |
| if( cu_mts_flag[ x0 ][ y0 ] && ( cIdx == 0 ) && transform_skip_flag[ x0 ][ y0 ][ cIdx ] && ( ( CuPredMode[ x0 ][ y0 ] == MODE_INTRA && numSigCoeff > 2 ) \|\| ( CuPredMode[ x0 ][ y0 ] == MODE_INTER ) ) ) { | | | | | | | | | |
|   mts_idx[ x0 ][ y0 ] | | | | | | | | | ae(v) |
| } | | | | | | | | | |

*FIG. 10C*

Inputs to this process are:

- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW - 1, y = 0..nTbH - 1.

Output of this process is the (nTbW)x(nTbH) array r[ x ][ y ] of residual samples with x = 0..nTbW - 1, y = 0..nTbH - 1.

*FIG. 12A*

*Continue from FIG. 12A*

The variable implicitMtsEnabled is derived as follows:

- If sps_mts_enabled_flag is equal to 1 and one of the following conditions is true, implicitMtsEnabled is set equal to 1:
  - IntraSubPartitionsSplitType is not equal to ISP_NO_SPLIT
  - cu_sbt_flag is equal to 1 and Max( nTbW, nTbH ) is less than or equal to 32
  - sps_explicit_mts_intra_enabled_flag and sps_explicit_mts_inter_enabled_flag are both equal to 0 and CuPredMode[ xTbY ][ yTbY ] is equal to MODE_INTRA Otherwise, implicitMtsEnabled is set equal to 0.

*FIG. 12B*

*Continue from FIG. 12B*

The variable trTypeHor specifying the horizontal transform kernel and the variable trTypeVer specifying the vertical transform kernel are derived as follows:

- If cIdx is greater than 0, trTypeHor and trTypeVer are set equal to 0.
- Otherwise, if implicitMtsEnabled is equal to 1, the following applies:
  - If IntraSubPartitionsSplitType is not equal to ISP_NO_SPLIT, trTypeHor and trTypeVer are specified depending on intraPredMode.
  - Otherwise, if cu_sbt_flag is equal to 1, trTypeHor and trTypeVer are specified depending on cu_sbt_horizontal_flag and cu_sbt_pos_flag.
  - Otherwise (sps_explicit_mts_intra_enabled_flag and sps_explicit_mts_inter_enabled_flag are equal to 0), trTypeHor and trTypeVer are derived as follows:

trTypeHor = ( nTbW >= 4 && nTbW <= 16 && nTbH <= nTbW ) ? 1 : 0 trTypeVer = ( nTbH >= 4 && nTbH <= 16 && nTbH <= nTbW ) ? 1 : 0

FIG. 12C

*Continue from FIG. 12C*

- Otherwise, trTypeHor and trTypeVer are specified depending on tu_mts_idx[ xTbY ][ yTbY ].

The variables nonZeroW and nonZeroH are derived as follows:

nonZeroW = Min( nTbW, ( trTypeHor > 0 ) ? 16 : 32 )

nonZeroH = Min( nTbH, ( trTypeVer > 0 ) ? 16 : 32 )

*FIG. 12D*

Continue from FIG. 12D

The (nTbW)x(nTbH) array r of residual samples is derived as follows:

1. When nTbH is greater than 1, each (vertical) column of scaled transform coefficients d[ x ][ y ] with x = 0..nonZeroW − 1, y = 0..nonZeroH − 1 is transformed to e[ x ][ y ] with x = 0..nonZeroW − 1, y = 0..nTbH − 1 by invoking the one-dimensional transformation process for each column x = 0..nonZeroW − 1 with the height of the transform block nTbH, the non-zero height of the scaled transform coefficients nonZeroH, the list d[ x ][ y ] with y = 0..nonZeroH − 1 and the transform type variable trType set equal to trTypeVer as inputs, and the output is the list e[ x ][ y ] with y = 0..nTbH − 1.

2. When nTbH and nTbW are both greater than 1, the intermediate sample values g[ x ][ y ] with x = 0..nonZeroW − 1, y = 0..nTbH − 1 are derived as follows:

g[ x ][ y ] = Clip3( CoeffMin, CoeffMax, ( e[ x ][ y ] + 64 ) >> 7 )

3. When nTbW is greater than 1, each (horizontal) row of the resulting array g[ x ][ y ] with x = 0..nonZeroW − 1, y = 0..nTbH − 1 is transformed to r[ x ][ y ] with x = 0..nTbW − 1, y = 0..nTbH − 1 by invoking the one-dimensional transformation process for each row y = 0..nTbH − 1 with the width of the transform block nTbW, the non-zero width of the resulting array g[ x ][ y ] nonZeroW, the list g[ x ][ y ] with x = 0..nonZeroW − 1 and the transform type variable trType set equal to trTypeHor as inputs, and the output is the list r[ x ][ y ] with x = 0..nTbW − 1.

*FIG. 12E*

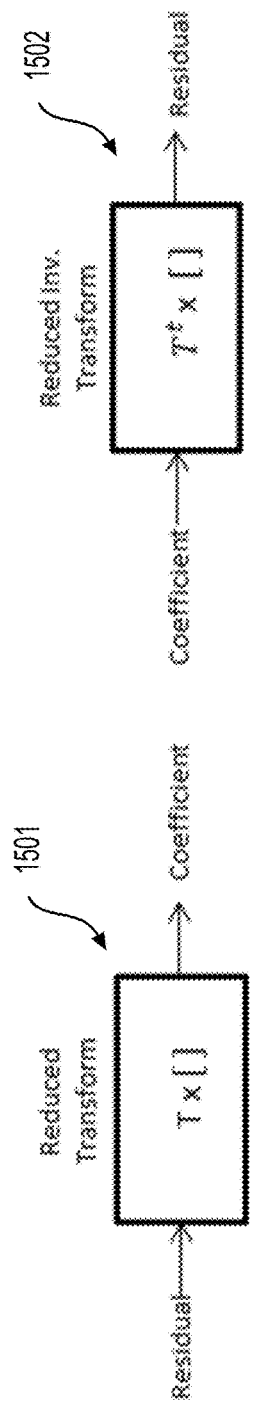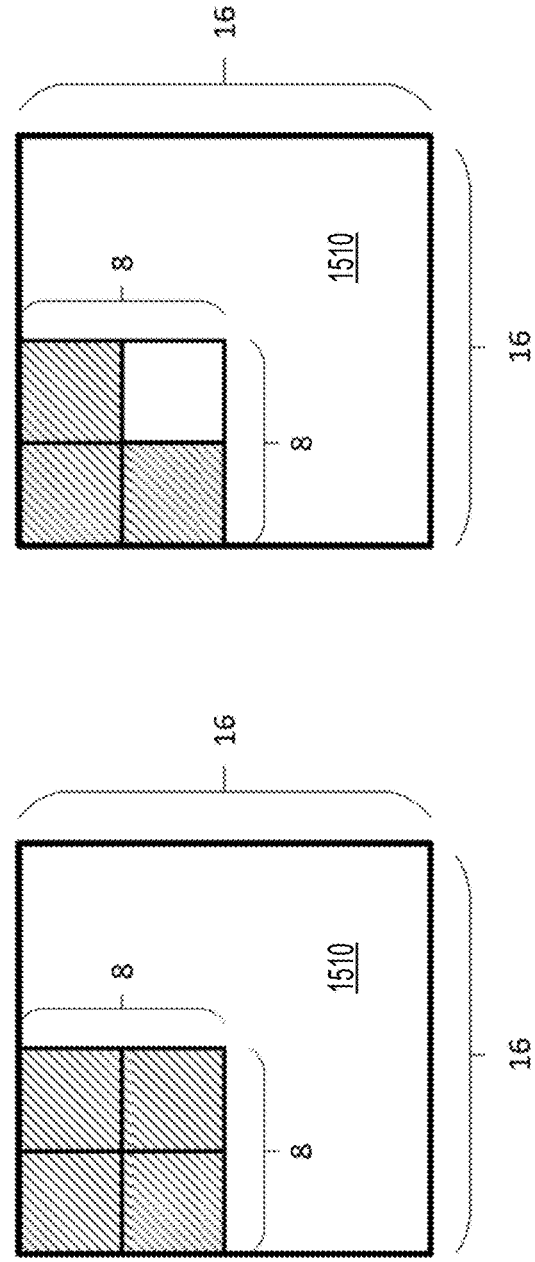
FIG. 15A Forward and Inverse Reduced Transform
FIG. 15B
FIG. 15C Transform Set Selection Table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

*FIG. 15D*

TABLE 4: NUMBER OF SUB-PARTITIONS THAT DEPENDS ON BLOCK SIZE

| BLOCK SIZE | NUMBER OF SUB-PARTITIONS |
|---|---|
| 4X4 | NOT DIVIDED |
| 4X8 AND 8X4 | 2 |
| ALL OTHER CASES | 4 |

*FIG. 18*

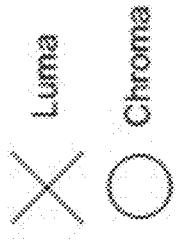
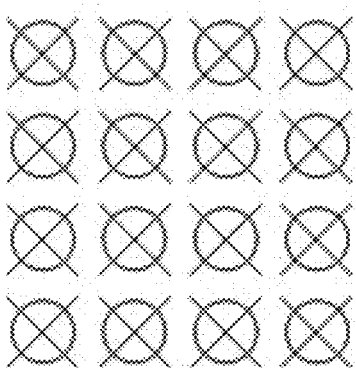
FIG. 21A
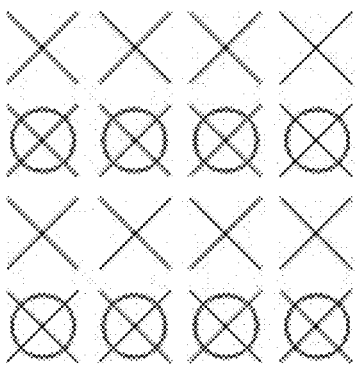
FIG. 21B
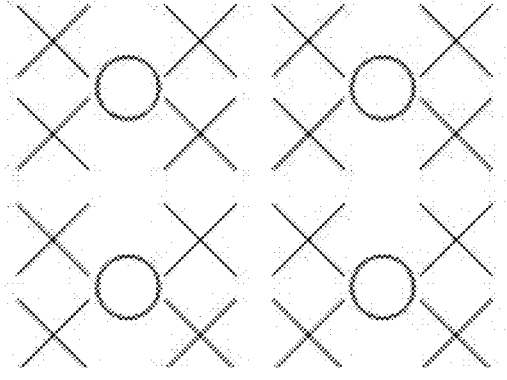
FIG. 21C
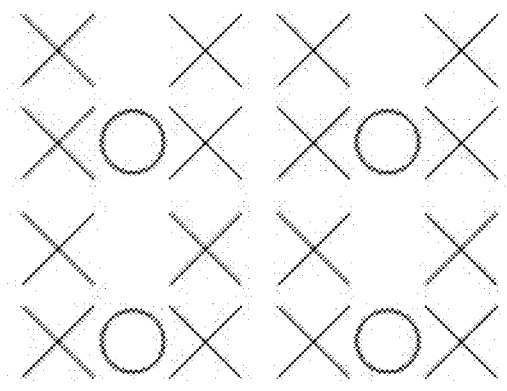
FIG. 21D

METHOD AND APPARATUS FOR VIDEO CODING

CROSS REFERENCE TO RELATED APPLICATIONS

The present application is a continuation of U.S. application Ser. No. 16/838,755, filed on Apr. 2, 2020, which claims the benefit of priority to U.S. Provisional Application No. 62/829,435, "Modifications on the Secondary Transform" filed on Apr. 4, 2019, the contents of which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry can decode coded information of a coding unit (CU) from a coded video bitstream. The coded information can indicate a last position of non-zero transform coefficients of a first coding block (CB) of the CU. The processing circuitry can determine whether a secondary transform index is signaled in the coded information based on the last position. The processing circuitry can determine whether to perform a secondary transform on a second CB based on whether the secondary transform index is determined to be signaled in the coded information. Responsive to the secondary transform being determined to be performed, the processing circuitry can perform the secondary transform on the second CB and reconstructing the second CB. Responsive to the secondary transform being determined not to be performed, the processing circuitry can reconstruct the second CB without performing the secondary transform on the second CB.

In an embodiment, the processing circuitry can determine whether a horizontal component of the last position is less than a first threshold and a vertical component of the last position is less than a second threshold. Responsive to the horizontal component being determined to be less than the first threshold and the vertical component being determined to be less than the second threshold, the processing circuitry can determine that the secondary transform index is not signaled in the coded information.

In an embodiment, the processing circuitry can determine whether a sum of a horizontal component and a vertical component of the last position is less than a threshold. Responsive to the sum being determined to be less than the threshold, the processing circuitry can determine that the secondary transform index is not signaled in the coded information.

In an embodiment, the processing circuitry can determine whether a minimum one of (i) a horizontal component and (ii) a vertical component of the last position is less than a threshold. Responsive to the minimum one being determined to be less than the threshold, the processing circuitry can determine that the secondary transform index is not signaled in the coded information.

In an embodiment, the processing circuitry can determine whether a maximum one of (i) a horizontal component and (ii) a vertical component of the last position is less than a threshold. Responsive to the maximum one being determined to be less than the threshold, the processing circuitry can determine that the secondary transform index is not signaled in the coded information.

In an embodiment, the first CB is a luma block. The last position is a last luma position for the luma block. The processing circuitry can determine whether the secondary transform index is signaled based on the last luma position.

In an embodiment, the first CB is a luma block. The last position is a last luma position for the luma block. The CU further includes a chroma block. The coding information further indicates a last chroma position of non-zero transform coefficients for the chroma block. The processing circuitry can determine whether the secondary transform index is signaled based on the last luma position and the last chroma position.

In some examples, an apparatus for video decoding includes processing circuitry. The processing circuitry can decode coding information of a coding unit (CU) from a coded video bitstream. The coding information can indicate a size of the CU. The processing circuitry can determine whether a secondary transform is allowed based on the size of the CU and a CU size threshold where when the size of the CU is less than or equal to the CU size threshold, the secondary transform is determined to be allowed, and when the size of the CU is larger than the CU size threshold, the secondary transform is determined not to be allowed.

In an embodiment, the CU size threshold is a maximum size of a transform unit in the CU.

In an embodiment, when the size of the CU is less than or equal to the CU size threshold, the processing circuitry can determine a number of non-zero transform coefficients for at least one CB in the CU where a size of each of the at least one CB is larger than or equal to a first threshold. Responsive to the number of non-zero transform coefficients being less than a second threshold, the processing circuitry can determine that a secondary transform index is not signaled in the coded information. In an example, the coding information indicates that a color format for the CU is YUV 4:2:0. The CU includes a luma block and two chroma blocks. The processing circuitry can determine whether a first dimension of the luma block is 4 and a second dimension of the luma block is N where N is larger than or equal to 4. Responsive to the first and second dimensions being determined to be 4 and N, respectively, the processing circuitry can determine the number of non-zero transform coefficients from only the luma block where the at least one CB is the luma block.

In an embodiment, the coding information indicates that a color format for the CU is YUV 4:2:2. The CU includes a luma block and two chroma blocks. The processing circuitry can determine whether a size of the luma block is 4×N where N is larger than or equal to 4. Responsive to the size of the luma block being determined to be 4×N where N and 4 are a height and a width of the luma block, respectively, the processing circuitry can determine the number of non-zero transform coefficients from only the luma block. The at least one CB is the luma block.

Aspects of the disclosure also provide a non-transitory computer-readable medium storing instructions which when executed by a computer for video decoding cause the computer to perform any of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 9 shows an example of transform unit syntax in accordance with an embodiment.

FIGS. 10A-10C show an example of residual coding syntax in accordance with an embodiment.

FIGS. 12A-12E show an example of transformation process in accordance with an embodiment.

FIG. 15A shows an exemplary process (1501) of a reduced forward transform and an exemplary process (1502) of a reduced inverse transform.

FIGS. 15B-15C show examples of reduced secondary transforms in accordance with some embodiments.

FIG. 15D shows an exemplary transform set selection able (1550).

FIG. 18 shows a table that associates a number of sub-partitions with a block size in accordance with an embodiment.

FIGS. 21A-21D show examples of different YUV formats.

DETAILED DESCRIPTION OF EMBODIMENTS

Figure 1A:
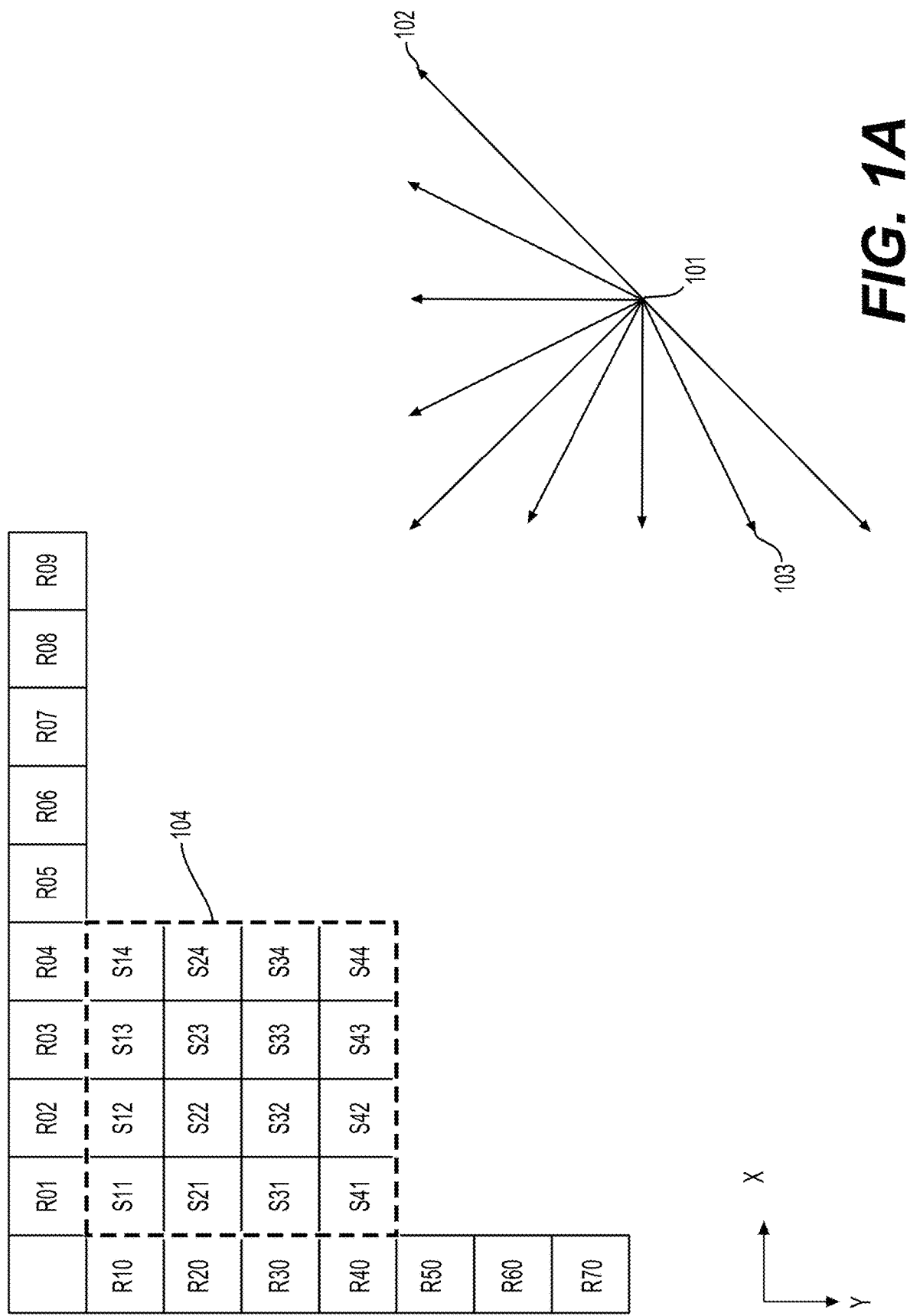
FIG. 1A is a schematic illustration of an exemplary subset of intra prediction modes.
Figure 1B:
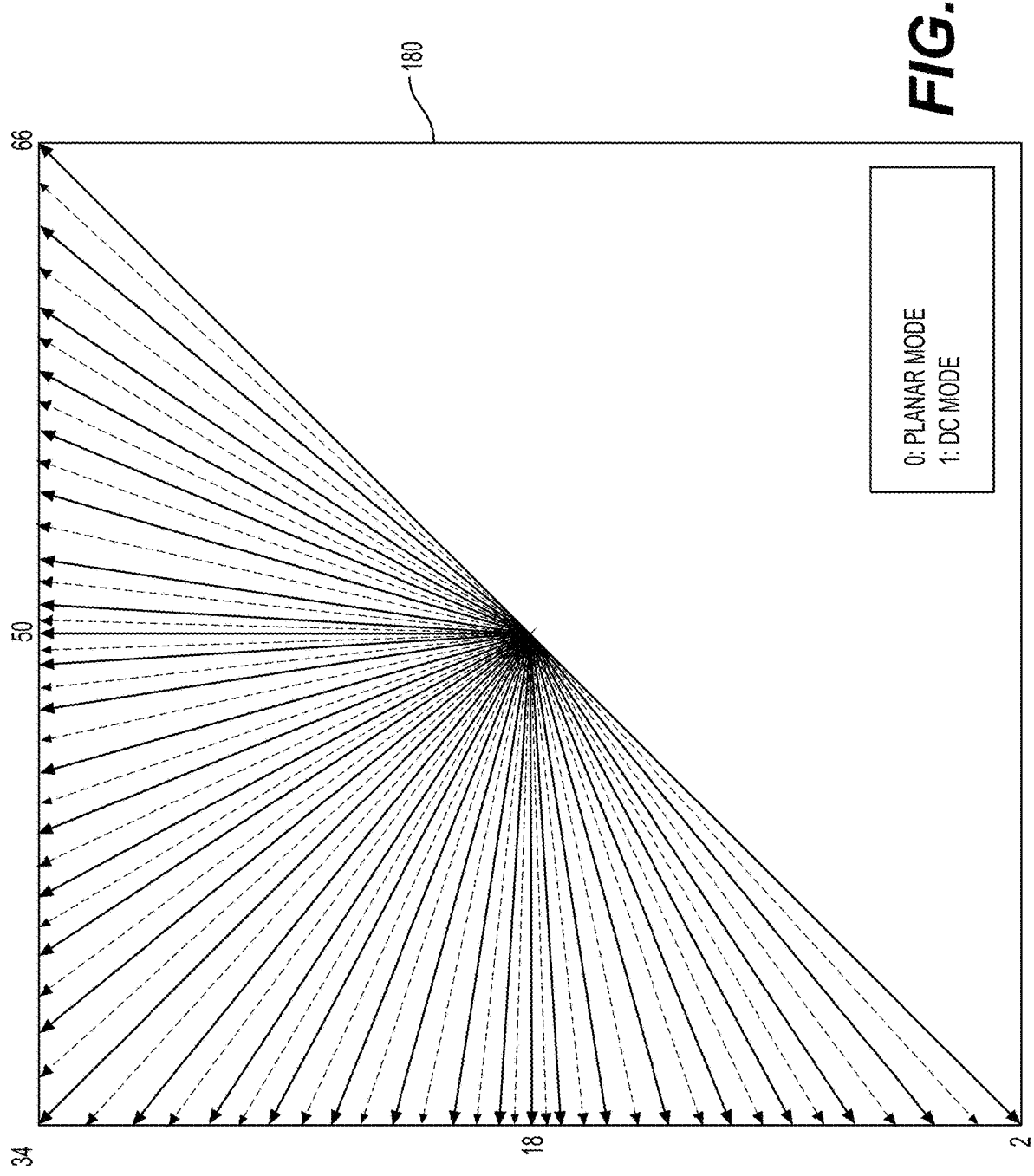
FIG. 1B is an illustration of exemplary intra prediction directions.
Figure 2:
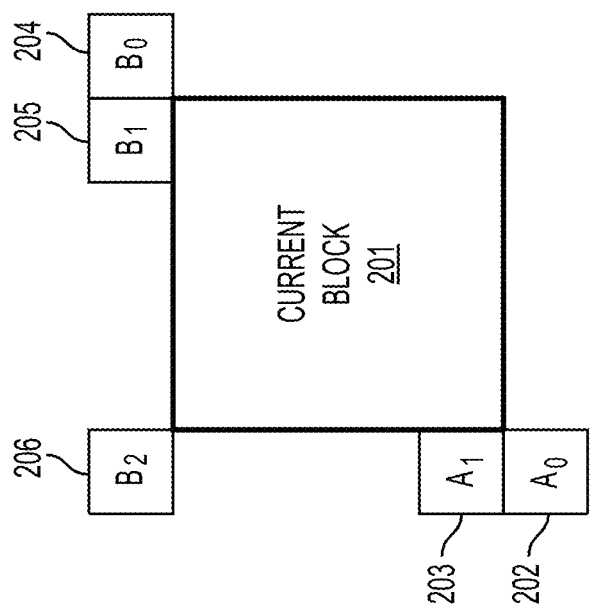
FIG. 2 is a schematic illustration of a current block and its surrounding spatial merge candidates in one example.
Figure 3:
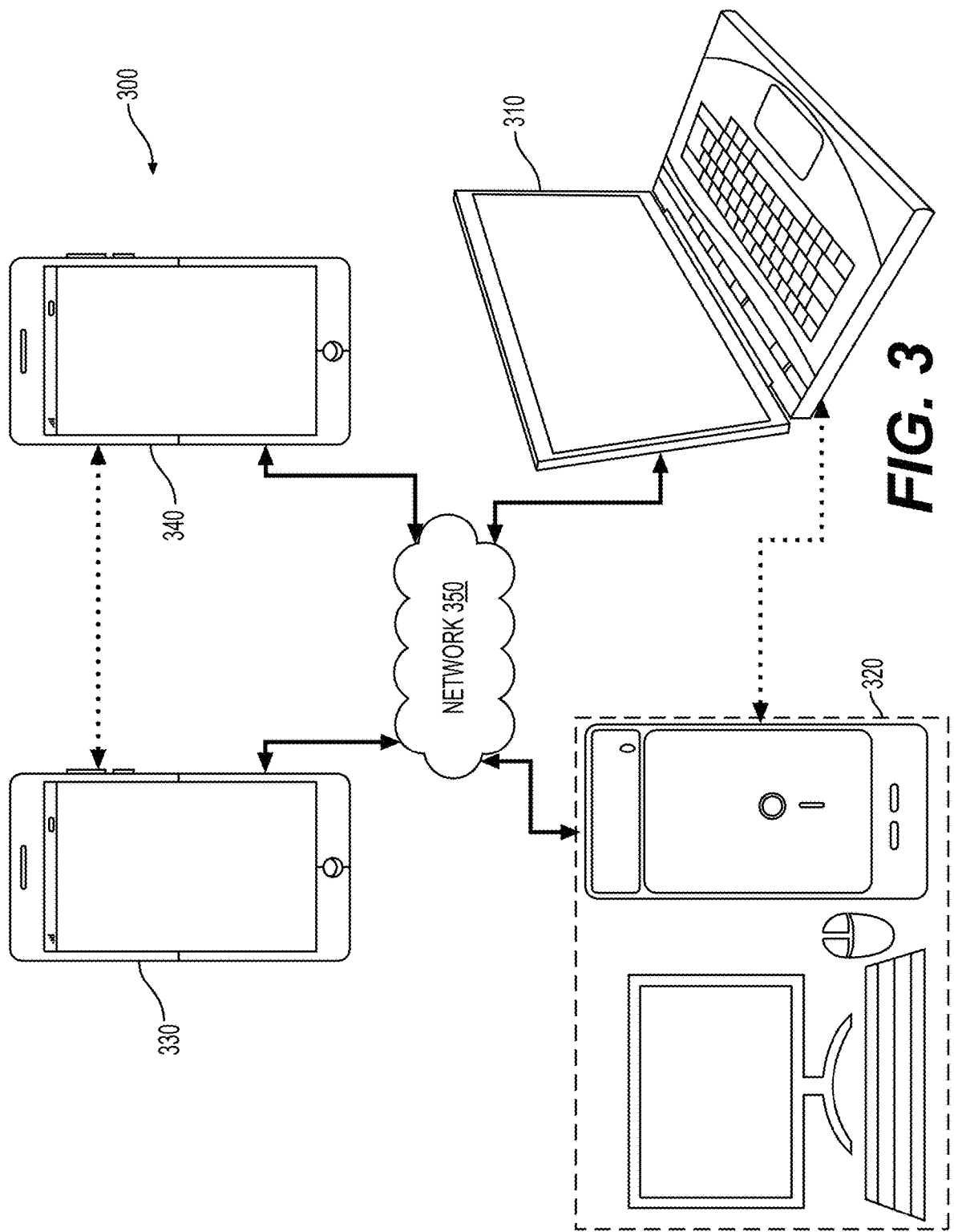
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
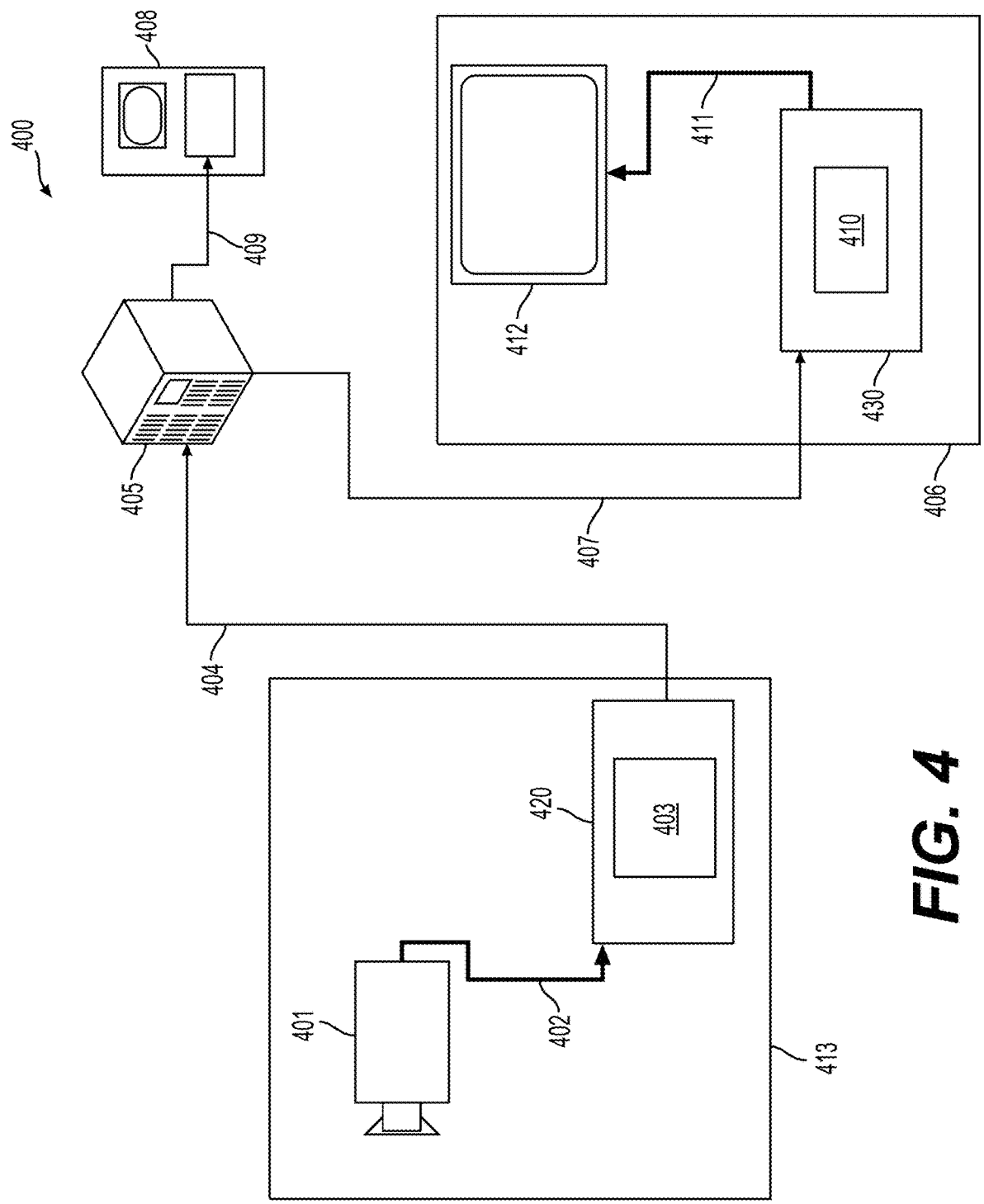
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
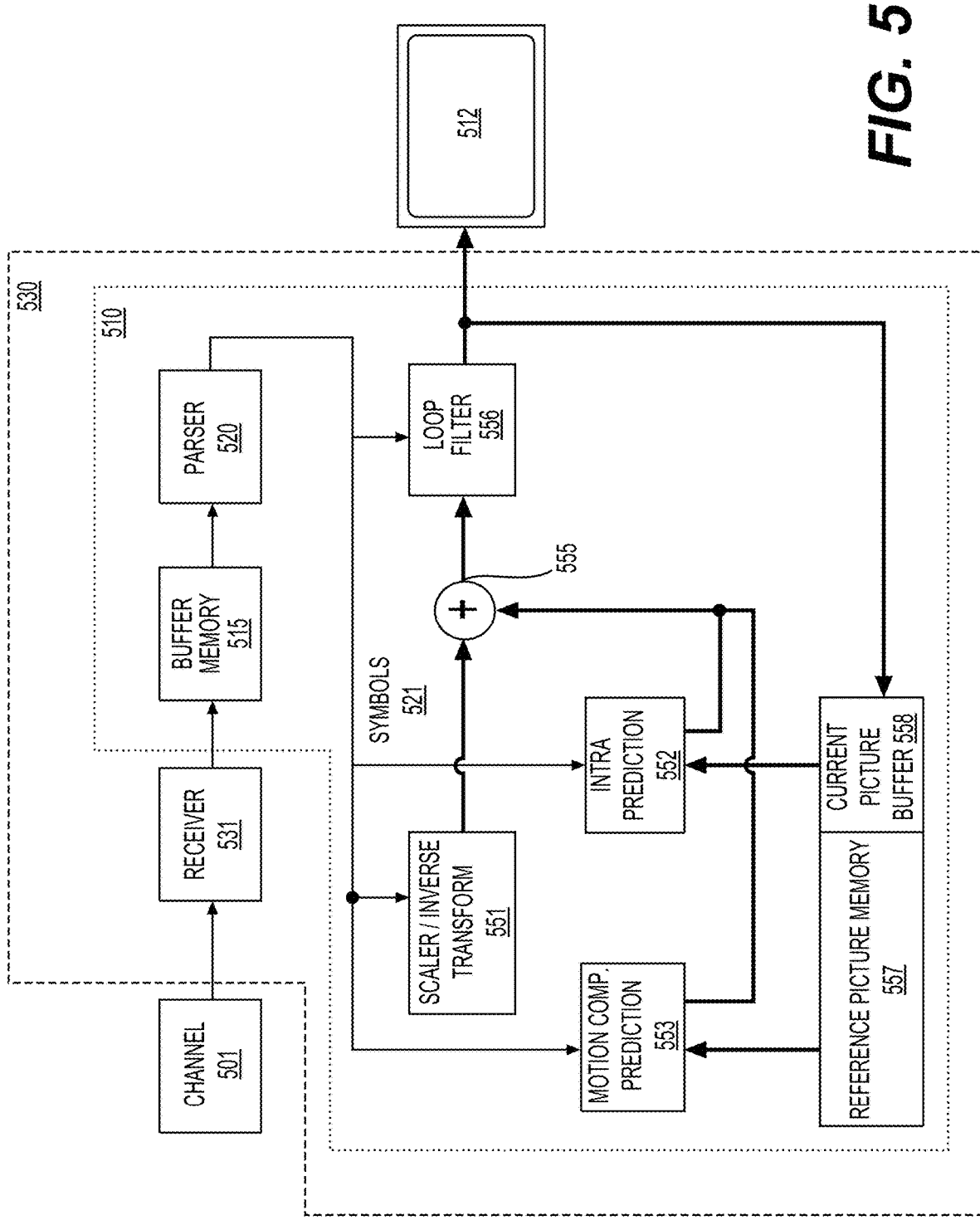
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
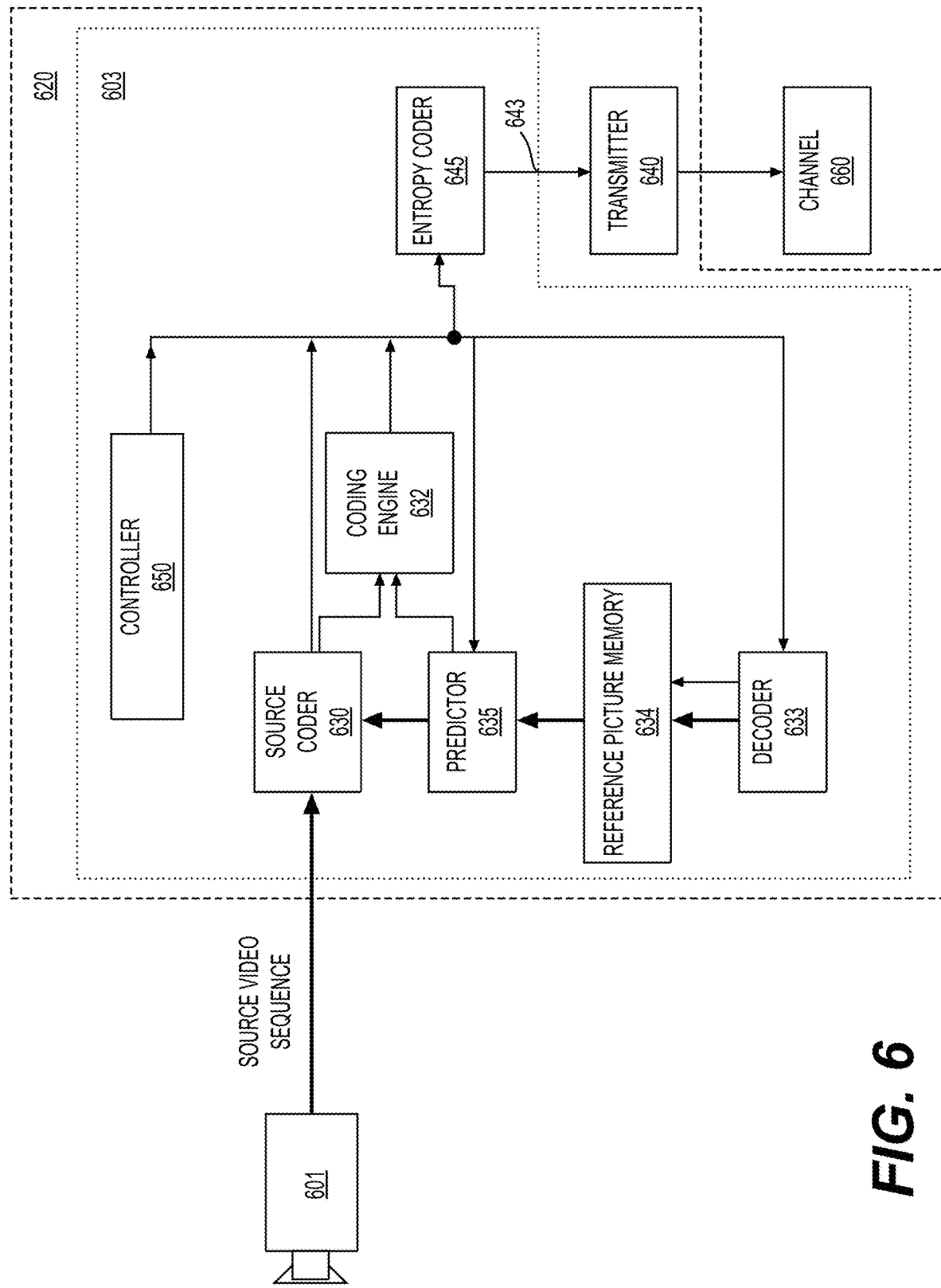
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
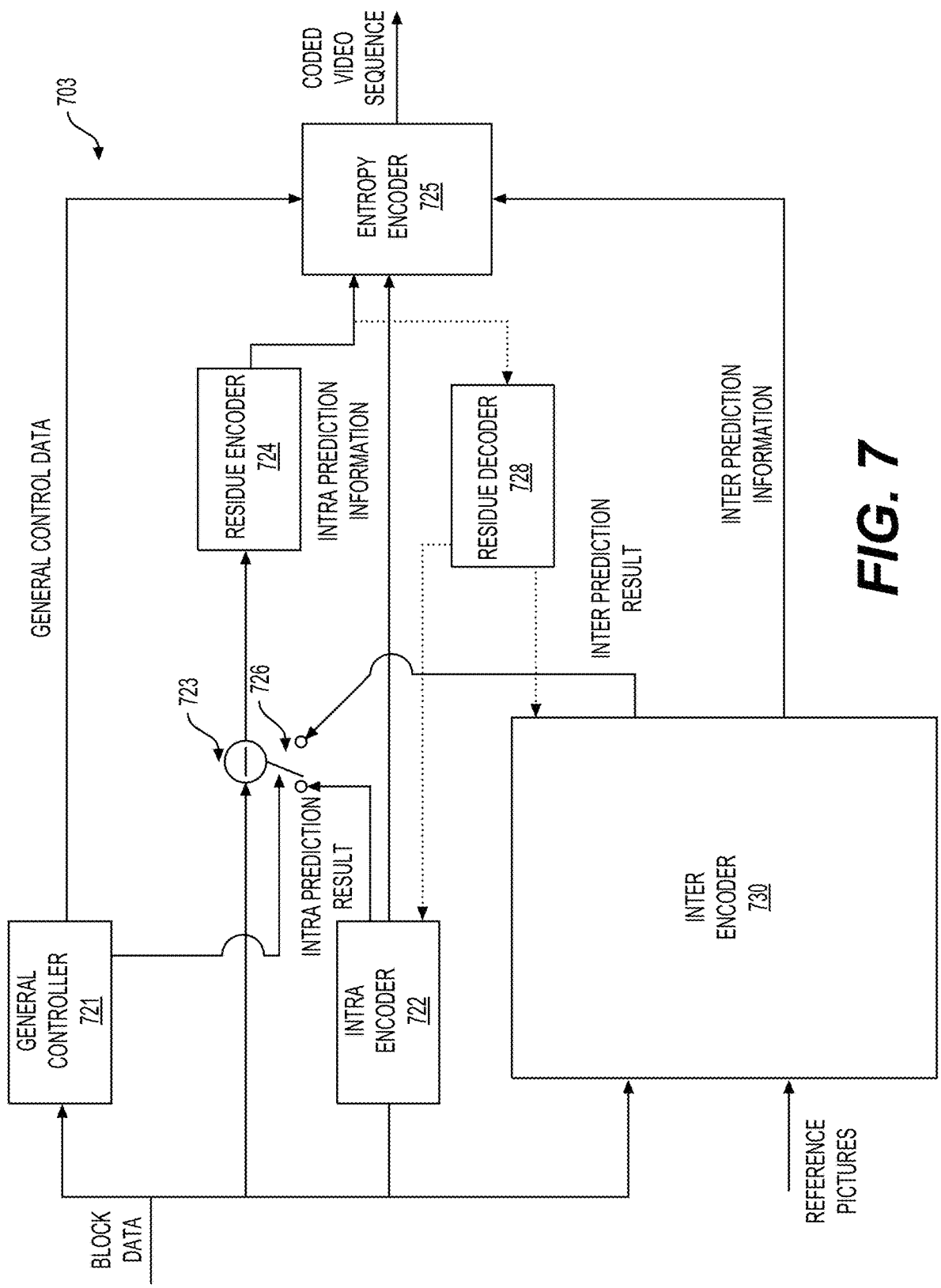
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
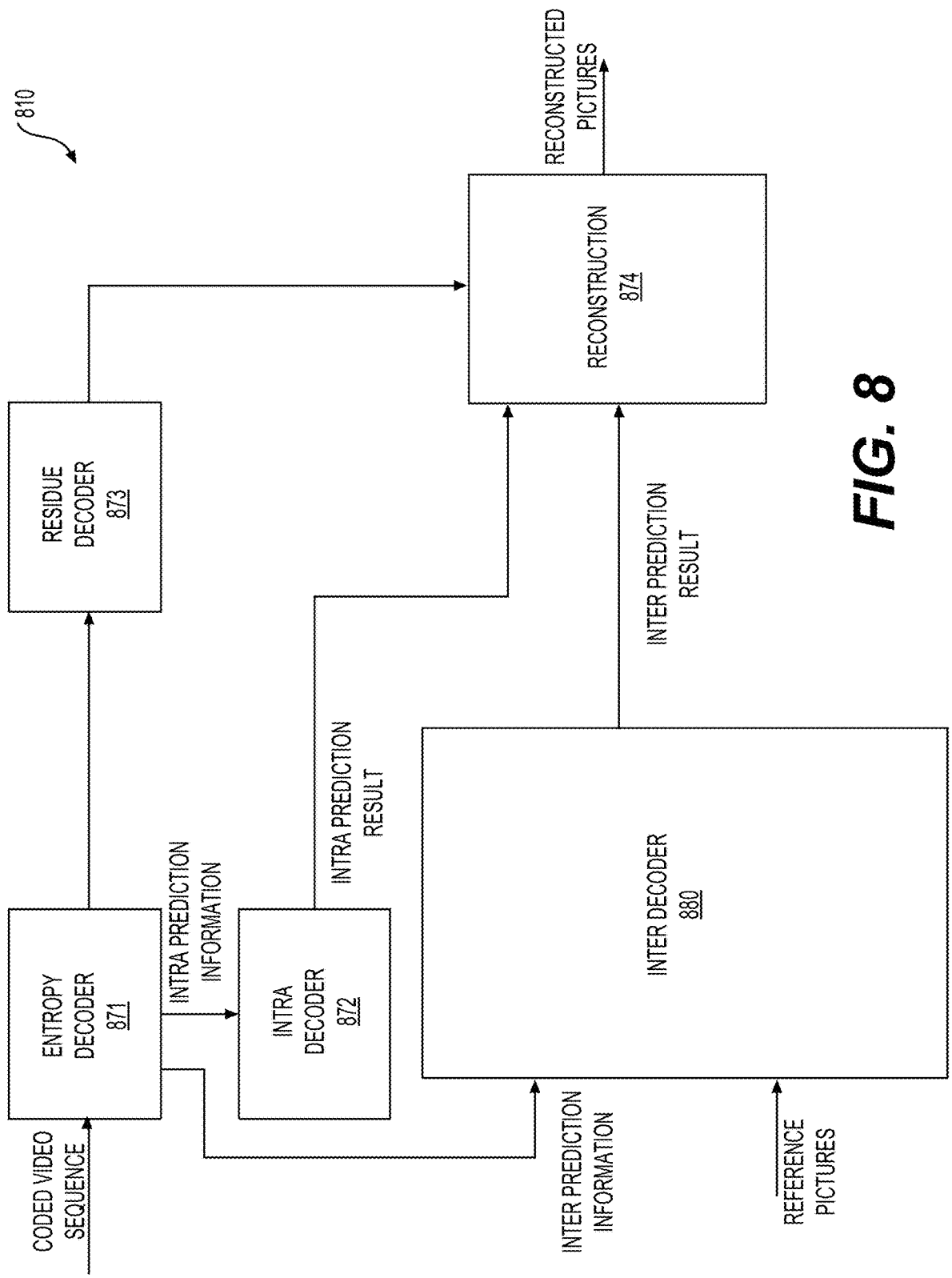
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure are related to modifications on a secondary transform, such as implementations of an inverse secondary transform.

In some embodiments, such as in HEVC, a primary transform may include 4-point, 8-point, 16-point and 32-point discrete cosine transform (DCT) type 2 (DCT-2), and the transform core matrices may be represented using 8-bit integers (i.e., 8-bit transform core). The transform core matrices of a smaller DCT-2 are part of transform core matrices of a larger DCT-2, as shown in APPENDIX I.

The DCT-2 core matrices show symmetry/anti-symmetry characteristics. Therefore, a "partial butterfly" implementation may be supported to reduce a number of operation counts (e.g., multiplications, additions, subtractions, shifts, and/or the like), and identical results of matrix multiplication can be obtained using the partial butterfly.

In some embodiments, such as in VVC, besides the 4-point, 8-point, 16-point, and 32-point DCT-2 transforms described above, additional 2-point and 64-point DCT-2 may also be included. An example of a 64-point DCT-2 core, such as used in VVC, is shown in APPENDIX II as a 64×64 matrix.

In addition to DCT-2 and 4×4 DST-7, such as used in HEVC, an Adaptive Multiple Transform (AMT) (also known as Enhanced Multiple Transform (EMT) or Multiple Transform Selection (MTS)) scheme, can be used, such as in VVC, for residual coding for both inter and intra coded blocks. The AMT scheme may use multiple selected transforms from the DCT/DST families other than the current transforms in HEVC. The newly introduced transform matrices are DST-7 and DCT-8. Table 1 shows examples of the basis functions of the selected DST/DCT for an N-point input.

TABLE 1

| Transform Type | Basis function $T_i(j)$, $i, j = 0, 1, \ldots, N - 1$ |
| --- | --- |
| DCT-2 | $T_i(j) = \omega_0 \cdot \sqrt{\dfrac{2}{N}} \cdot \cos\left(\dfrac{\pi \cdot i \cdot (2j+1)}{2N}\right)$ <br> where $\omega_0 = \begin{cases} \sqrt{\dfrac{2}{N}} & i = 0 \\ 1 & i \neq 0 \end{cases}$ |
| DCT-8 | $T_i(j) = \sqrt{\dfrac{4}{2N+1}} \cdot \cos\left(\dfrac{\pi \cdot (2i+1) \cdot (2j+1)}{4N+2}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

The primary transform matrices, such as used in VVC, may be used with 8-bit representation. The AMT applies transform matrices to the CUs with both a width and a height smaller than or equal to 32. Whether AMT is applied may be controlled by a flag (e.g., an mts_flag). When the mts_flag is equal to 0, in some examples, only DCT-2 is applied for coding residue data. When the mts_flag is equal to 1, an index (e.g., an mts_idx) may be further signalled using 2 bins to identify the horizontal and vertical transform to be used according to Table 2, where a type value of 1 means DST-7 is used, and a type value of 2 means DCT-8 is used. In Table 2, the specification of trTypeHor and trTypeVer depends on mts_idx[x][y][cIdx].

TABLE 2

| mts_idx[ xTbY ][ yTbY ][ cIdx ] | trTypeHor | trTypeVer |
|---|---|---|
| −1 | 0 | 0 |
| 0 | 1 | 1 |
| 1 | 2 | 1 |
| 2 | 1 | 2 |
| 3 | 2 | 2 |

In some embodiments, an implicit MTS can be applied when the above signaling based MTS (i.e., explicit MTS) is not used. With the implicit MTS, the transform selection is made according to the block width and height instead of the signaling. For example, with an implicit MTS, DST-7 is selected for a shorter side (i.e., a minimum one of M and N) of the block of M×N and DCT-2 is selected for a longer side (i.e., a maximum one of M and N) of the block.

Exemplary transform cores, each of which is a matrix composed by the basis vectors, of DST-7 and DCT-8 are illustrated in APPENDIX III.

In some examples, such as in VVC, when both the height and width of the coding block is smaller than or equal to 64, the TB size is the same as the coding block size. When either the height or width of the coding block is larger than 64, when doing a transform (such as an inverse transform, an inverse primary transform, or the like) or intra prediction, the coding block is further split into multiple sub-blocks, where the width and height of each sub-block is smaller than or equal to 64. One transform can be performed on each sub-block.

Related syntax and semantics of MTS in some examples in VVC can be described below (highlighted using gray color) in FIGS. 9 and 10A-10C. FIG. 9 shows an example of transform unit syntax. FIGS. 10A-10C show an example of a residual coding syntax.

An example of the transform unit semantics is as follows. cu_mts_flag[x0][y0] equal to 1 specifies that multiple transform selection is applied to the residual samples of the associated luma transform block. cu_mts_flag[x0][y0] equal to 0 specifies that multiple transform selection is not applied to the residual samples of the associated luma transform block. The array indices x0, y0 specify the location (x0, y0) of the top-left luma sample of the considered transform block relative to the top-left luma sample of the picture. When cu_mts_flag[x0][y0] is not present, it is inferred to be equal to 0.

An example of the residual coding semantics is as follows. mts_idx[x0][y0] specifies which transform kernels are applied to the luma residual samples along the horizontal and vertical direction of the current transform block. The array indices x0, y0 specify the location (x0, y0) of the top-left luma sample of the considered transform block relative to the top-left luma sample of the picture. When mts_idx[x0][y0] is not present, it is inferred to be equal to −1.

Figures 11A, 11B:
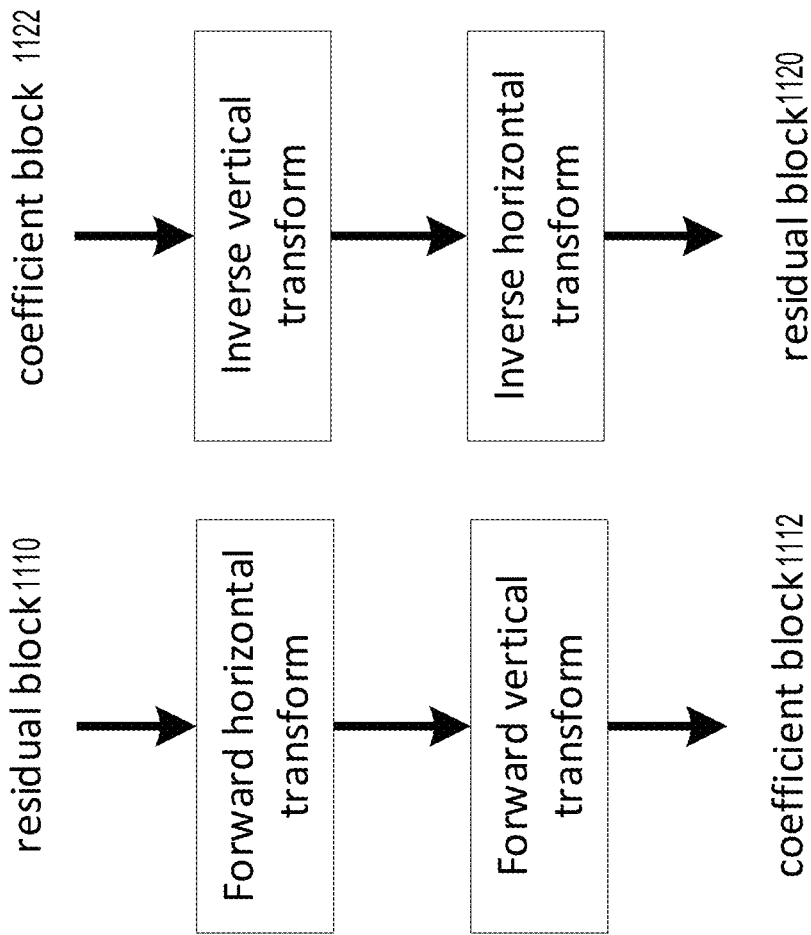
FIGS. 11A-11B show examples of primary transforms in accordance with an embodiment.

FIG. 11A shows an exemplary forward transform (also referred to as a forward primary transform) performed by an encoder. The forward transform can include a forward horizontal transform and a forward vertical transform. The forward horizontal transform is applied first to a residual block (1110) having residual data to obtain an intermediate block. Subsequently, the forward vertical transform is applied to the intermediate block to obtain a coefficient block (1112) having transform coefficients.

FIG. 11B shows an exemplary backward transform (also referred to as an inverse primary transform or an inverse transform) performed by a decoder. Generally speaking, the inverse transform matches the forward transform. The inverse primary transform can include an inverse primary horizontal transform (also referred to as an inverse horizontal transform) and an inverse primary vertical transform (also referred to as an inverse vertical transform). To match the forward transform, an order of applying the inverse horizontal and vertical transforms is switched in the inverse transform. Accordingly, the inverse vertical transform is applied first to a coefficient block (1122) to obtain an intermediate block. Subsequently, the inverse horizontal transform is applied to the intermediate block to obtain a residual block (1120).

A primary transform can refer to a forward primary transform or an inverse primary transform. A horizontal transform can refer to an inverse horizontal transform or a forward horizontal transform. Similarly, a vertical transform can refer to an inverse vertical transform or a forward vertical transform.

In an example, such as in VVC, at the decoder, the inverse vertical primary transform is performed first, then the inverse horizontal primary transform is performed second after applying the inverse vertical transform, as indicated in FIGS. 12A-12E in texts highlighted in gray color. FIGS. 12A-12E show an example of a transformation process, for example, for scaled transform coefficients. The texts highlighted in gray color are shown FIG. 12E.

In an embodiment, a mode-dependent non-separable secondary transform (NSST) can be used between a forward core transform and a quantization at an encoder side and between a de-quantization and an inverse core transform at a decoder side. For example, to keep a low complexity, a NSST is applied to low frequency coefficients after a primary transform (or a core transform). When both a width (W) and a height (H) of a transform coefficient block are larger than or equal to 8, an 8×8 NSST is applied to a top-left 8×8 region of the transform coefficients block. Otherwise, when either the width W or the height H of the transform coefficient block is 4, a 4×4 NSST is applied, and the 4×4 NSST is performed on a top-left min(8,W)×min(8,H) region of the transform coefficient block. The above transform selection method is applied for both luma and chroma components.

A matrix multiplication implementation of a NSST is described as follows using a 4×4 input block as an example. The 4×4 input block X is written in Eq. (1) as $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad (1)$$

The input block X can be represented as a vector $\vec{X}$ in Eq. (2) where $$\vec{X}=[X_{00}X_{01}X_{02}X_{03}X_{10}X_{11}X_{12}X_{13}X_{20}X_{21}X_{22}X_{23}X_{30}X_{31}X_{32}X_{33}]^T \quad (2)$$

The non-separable transform is calculated as $\vec{F}=T\cdot\vec{X}$, where F indicates a transform coefficient vector, and T is a 16×16 transform matrix. The 16×1 transform coefficient vector $\vec{F}$ is subsequently reorganized as a 4×4 block using a scanning order (for example, a horizontal scanning order, a vertical scanning order or a diagonal scanning order) for the input block X. Coefficients with smaller indices can be placed with smaller scanning indices in the 4×4 coefficient block. In some embodiments, a Hypercube-Givens Transform (HyGT) with a butterfly implementation can be used instead of the matrix multiplication described above to reduce the complexity of the NSST.

In an example, 35×3 non-separable secondary transforms are available for both 4×4 and 8×8 block sizes, where 35 is a number of transform sets associated with the intra prediction modes, and 3 is a number of NSST candidates for each intra prediction mode. Table 3 shows an exemplary mapping from an intra prediction mode to a respective transform set. A transform set applied to luma/chroma transform coefficients is specified by a corresponding luma/chroma intra prediction mode, according to Table 3 that shows mapping from an intra prediction mode to a transform set index. For an intra prediction mode larger than 34, which corresponds to a diagonal prediction direction, a transform coefficient block is transposed before/after the NSST at the encoder/decoder, respectively.

For each transform set, a selected NSST candidate can be further specified by an explicitly signaled CU level NSST index. The CU level NSST index is signaled in a bitstream for each intra coded CU after transform coefficients and a truncated unary binarization is used for the CU level NSST index. For example, a truncated value is 2 for the planar or the DC mode, and 3 for an angular intra prediction mode. In an example, the CU level NSST index is signaled only when there is more than one non-zero coefficient in the CU. The default value is zero and not signaled, indicating that a NSST is not applied to the CU. Each of values 1-3 indicates which NSST candidate is to be applied from the transform set.

In some embodiments, a NSST is not applied for a block coded with a transform skip mode. When the CU level NSST index is signaled for a CU and not equal to zero, a NSST is not used for a block that is coded with the transform skip mode in the CU. When the CU with blocks of all components are coded in a transform skip mode or a number of non-zero coefficients of non-transform-skip mode CBs is less than 2, the CU level NSST index is not signaled for the CU.

In some embodiments, a variant of NSST, such as a reduced size transform (RST), is employed. The RST uses a transform zero-out scheme. In an example, in the RST, whether the intra prediction mode is Planar or DC is checked for entropy coding the transform index of NSST.

In an example, 4 transform sets are applied, and each transform set includes three RST transform cores. The RST transform cores can have a size of 16×48 (or 16×64) (applied for transform coefficient block with a height and width both being greater than or equal to 8) or 16×16 (applied for transform coefficient block with either height or width being equal to 4). For notational convenience, the 16×48 (or 16×64) transform is denoted as RST8×8 and the 16×16 one as RST4×4.

Figure 13:
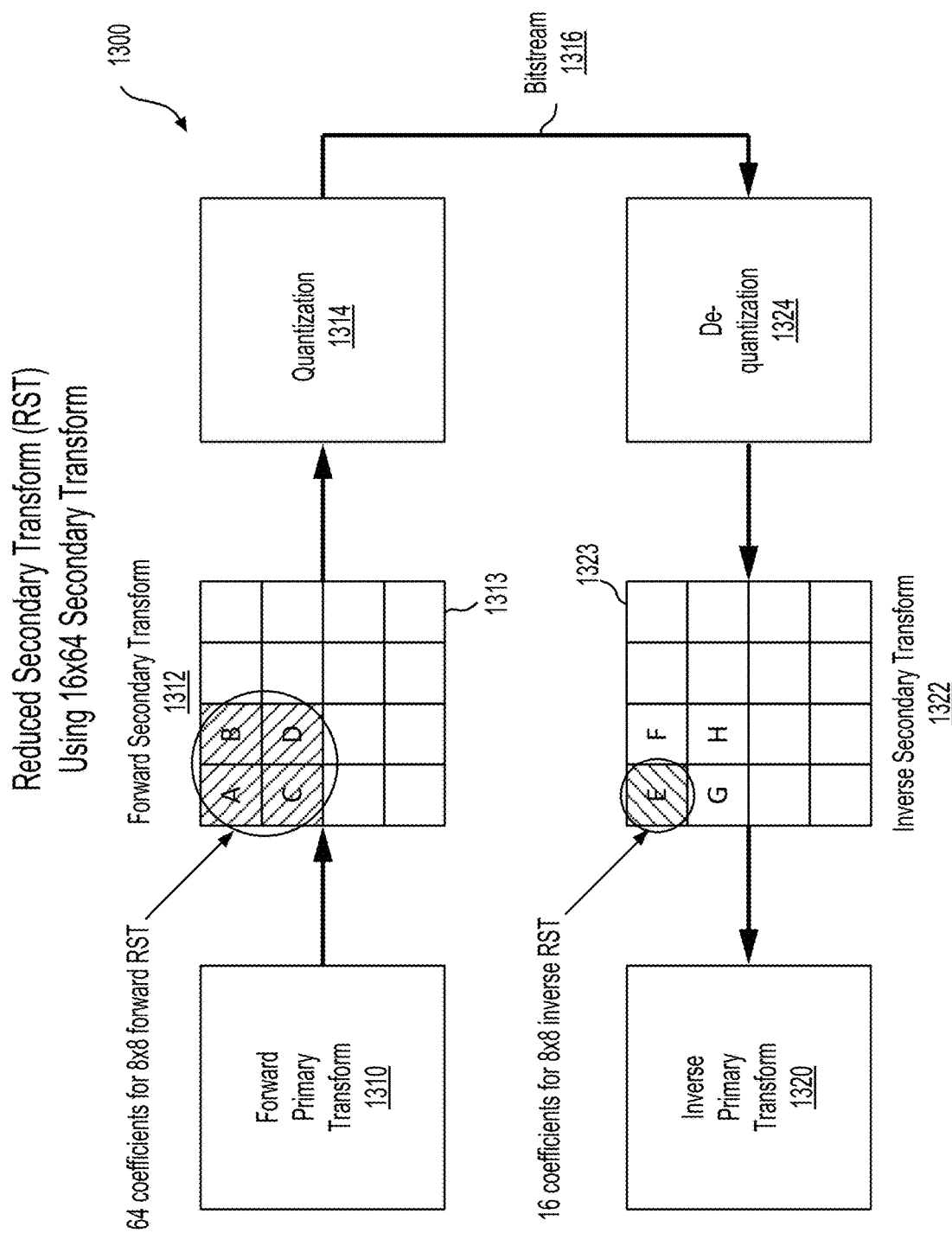
FIG. 13 shows an exemplary transform coding process (1300).
Figure 14:
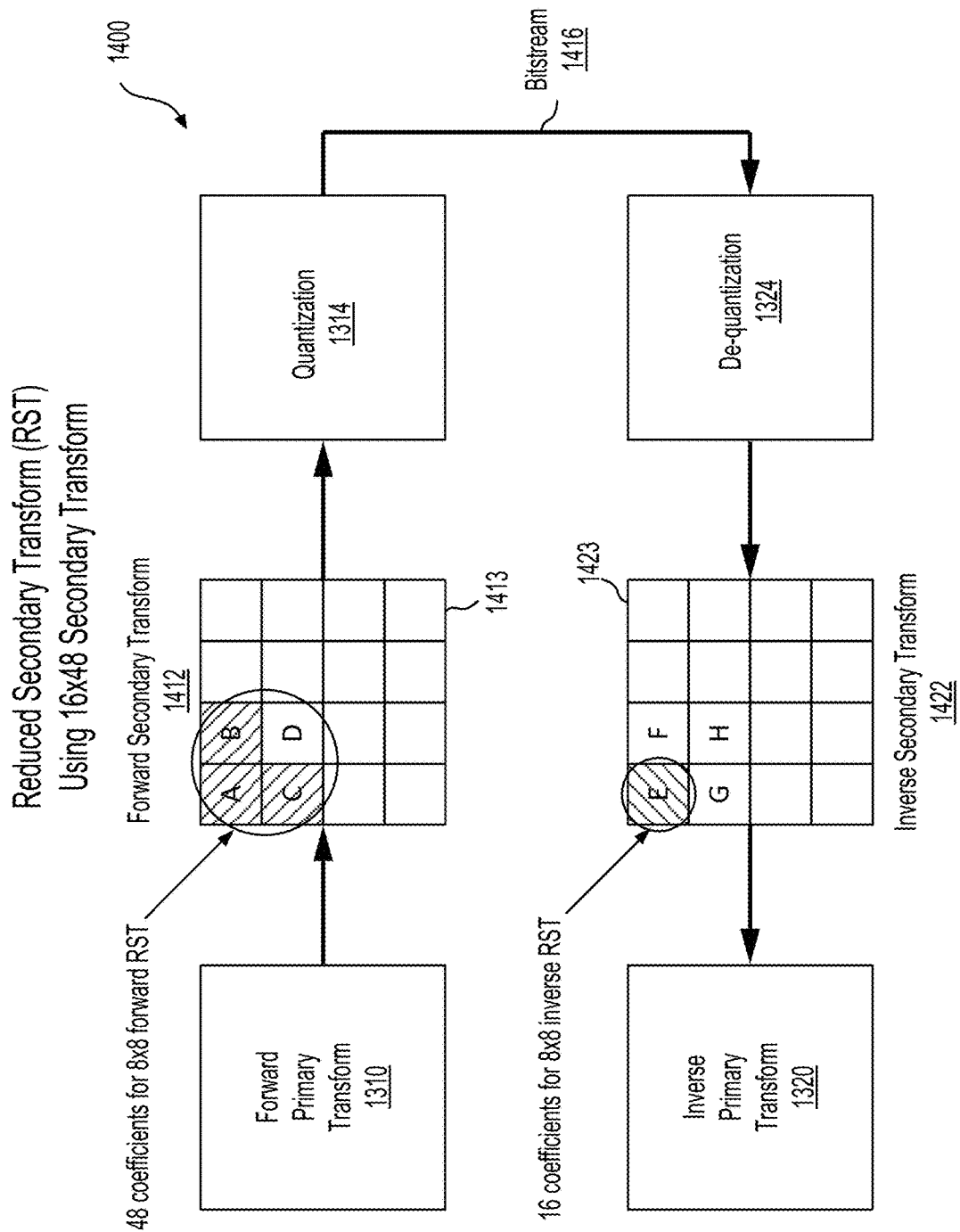
FIG. 14 shows an exemplary transform coding process (1400).

FIG. 13 and FIG. 14 show examples of two transform coding processes (1300) and (1400) using a 16×64 transform (or a 64×16 transform depending on whether the transform is a forward or inverse secondary transform) and a 16×48 transform (or a 48×16 transform depending on whether the transform is a forward or inverse secondary transform), respectively. Referring to FIG. 13, in the process (1300), at an encoder side, a forward primary transform (1310) can first be performed over a residual block to obtain a coefficient block (1313). Subsequently, a forward secondary transform (1312) can be applied to the coefficient block (1313). In the forward secondary transform (1312), 64 coefficients of 4×4 sub-blocks A-D at a top-left corner of the coefficient block (1313) can be represented by a 64-length vector, and the 64-length vector can be multiplied with a transform matrix of 64×16 (i.e., a width of 64 and a height of 16) according to Eq. (2), resulting in a 16-length vector. Elements in the 16-length vector are filled back into the top-left 4×4 sub-block A of the coefficient block (1313). The coefficients in the sub-blocks B-D can be zero. The resulting coefficients after the forward secondary transform (1312) are then quantized at a step (1314), and entropy-coded to generate coded bits in a bitstream (1316).

The coded bits can be received at a decoder side, and entropy-decoded followed by a de-quantization (1324) to generate a coefficient block (1323). An inverse secondary transform (1322), such as an inverse RST8×8 can be performed to obtain 64 coefficients, for example, from the 16 coefficients at a top-left 4×4 sub-block E. The 64 coefficients can be filled back to the 4×4 sub-blocks E-H. Further, the coefficients in the coefficient block (1323) after the inverse

TABLE 3

| Intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 |
| Intra mode | 17 | 18 | 19 | 20 | 21 | 22 | 23 | 24 | 25 | 26 | 27 | 28 | 29 | 30 | 31 | 32 | 33 |
| set | 17 | 18 | 19 | 20 | 21 | 22 | 23 | 24 | 25 | 26 | 27 | 28 | 29 | 30 | 31 | 32 | 33 |
| Intra mode | 34 | 35 | 36 | 37 | 38 | 39 | 40 | 41 | 42 | 43 | 44 | 45 | 46 | 47 | 48 | 49 | 50 |
| set | 34 | 33 | 32 | 31 | 30 | 29 | 28 | 27 | 26 | 25 | 24 | 23 | 22 | 21 | 20 | 19 | 18 |
| Intra mode | 51 | 52 | 53 | 54 | 55 | 56 | 57 | 58 | 59 | 60 | 61 | 62 | 63 | 64 | 65 | 66 | 67(LM) |
| set | 17 | 16 | 15 | 14 | 13 | 12 | 11 | 10 | 9 | 8 | 7 | 6 | 5 | 4 | 3 | 2 | NULL | secondary transform (1322) can be processed with an inverse primary transform (1320) to obtain a recovered residual block.

The process (1400) of the FIG. 14 example is similar to the process (1300) except that fewer (i.e., 48) coefficients are processed during the forward secondary transform (1412). Specifically, the 48 coefficients in the sub-blocks A-C are processed with a smaller transform matrix of a size of 48×16. Using the smaller transform matrix of 48×16 can reduce a memory size for storing the transform matrix and a number of calculations (e.g., multiplications, additions, subtractions, and/or the like), and thus can reduce computation complexity.

A Reduced Transform (RT) (also referred to as RST) can map an N dimensional vector to an R dimensional vector in a different space, where R/N (R<N) is a reduction factor.

The RST (or RT) matrix is an R×N matrix as follows:

$$T_{R \times N} = \begin{bmatrix} t_{11} & t_{12} & t_{13} & & t_{1N} \\ & & \cdots & & \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where R rows of the transform are R bases of the N dimensional space. The inverse transform matrix for RT is the transpose of its forward transform.

FIG. 15A shows a process (1501) of a reduced forward transform and a process (1502) of a reduced inverse transform. T represents an RST transform matrix having a dimension of R×N, and $T^T$ represents a transpose matrix of T and $T^T$ has a dimension of N×R.

In RST8×8, a reduction factor of 4 (¼ size) can be realized. For example, instead of 64×64, which is a conventional 8×8 non-separable transform matrix size, a 16×64 direct matrix can be used. The 64×16 inverse RST matrix can be used at the decoder side to generate core (primary) transform coefficients in an 8×8 top-left region. The forward RST8×8 uses 16×64 (or 8×64 for 8×8 block) matrices so that the forward RST8×8 produces non-zero coefficients only in the top-left 4×4 region within the given 8×8 top-left region. In other words, when RST is applied, a region in the 8×8 top-left region that is outside the top-left 4×4 region has only zero coefficients. For RST4×4, 16×16 (or 8×16 for 4×4 block) direct matrix multiplication can be applied.

In addition, for RST8×8, to further reduce the transform matrix size, instead of the using the whole top-left 8×8 coefficients (64 coefficients in shaded sub-blocks in FIG. 15B) of a residual block (1510) as input for calculating a secondary transform, the top-left three 4×4 sub-block coefficients (48 coefficients in shaded sub-blocks in FIG. 15C) of the residual block (1510) are used as the input for calculating the secondary transform. Accordingly, a 16×64 transform matrix is used in FIG. 15B, and a 16×48 transform matrix is used in FIG. 15C.

In an example, an inverse RST is conditionally applied where the inverse RST is applied when the following two conditions are satisfied: (i) a block size (e.g., a width W and/or a height H of the block) is greater than or equal to a threshold (e.g., W>=4 and H>=4), and (ii) a transform skip mode flag is equal to zero. For example, if both width (W) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

In an example, when an RST index is equal to 0, RST is not applied. Otherwise, RST is applied, and a kernel is chosen with the RST index. In an example, RST is applied for an intra CU (e.g., a CU coded in intra prediction or intra mode) in both intra and inter slices, and for both luma and chroma. If a dual tree is enabled, RST indices for luma and chroma are signaled separately. For inter slice (the dual tree is disabled), a single RST index is signaled and used for both luma and chroma. When an ISP mode is selected, RST is disabled, and RST index is not signaled.

In an example, an RST matrix can be selected from four transform sets, each of which consists of two transforms. Which transform set is applied can be determined based on an intra prediction mode as follows. When one of three cross component linear model (CCLM) modes is indicated, a transform set 0 can be selected. Otherwise, the transform set selection can be performed according to a table (1550) shown in FIG. 15D. An index (e.g., an IntraPredMode) to access the Table (1550) can be in a range of [−14, 80], which is a transformed mode index used for a wide angle intra prediction for example. An example of the intra prediction modes is shown in FIG. 16B. In an example, an index to access the Table (1550) can be in a range of [−14, 83] or any suitable range.

Figure 16A:
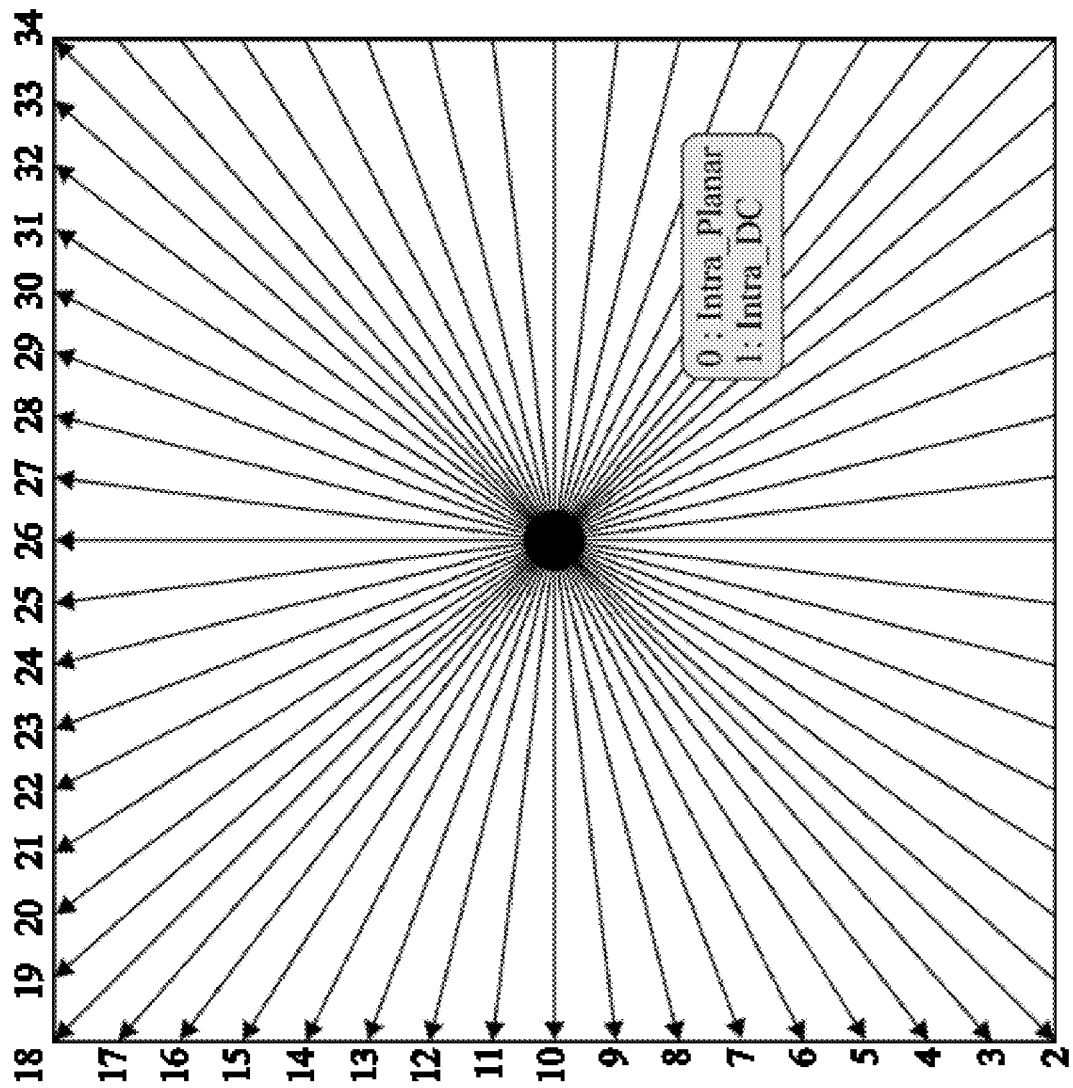
FIG. 16A shows an illustration of exemplary intra prediction directions and the intra prediction modes in accordance with an embodiment.
Figure 16B:
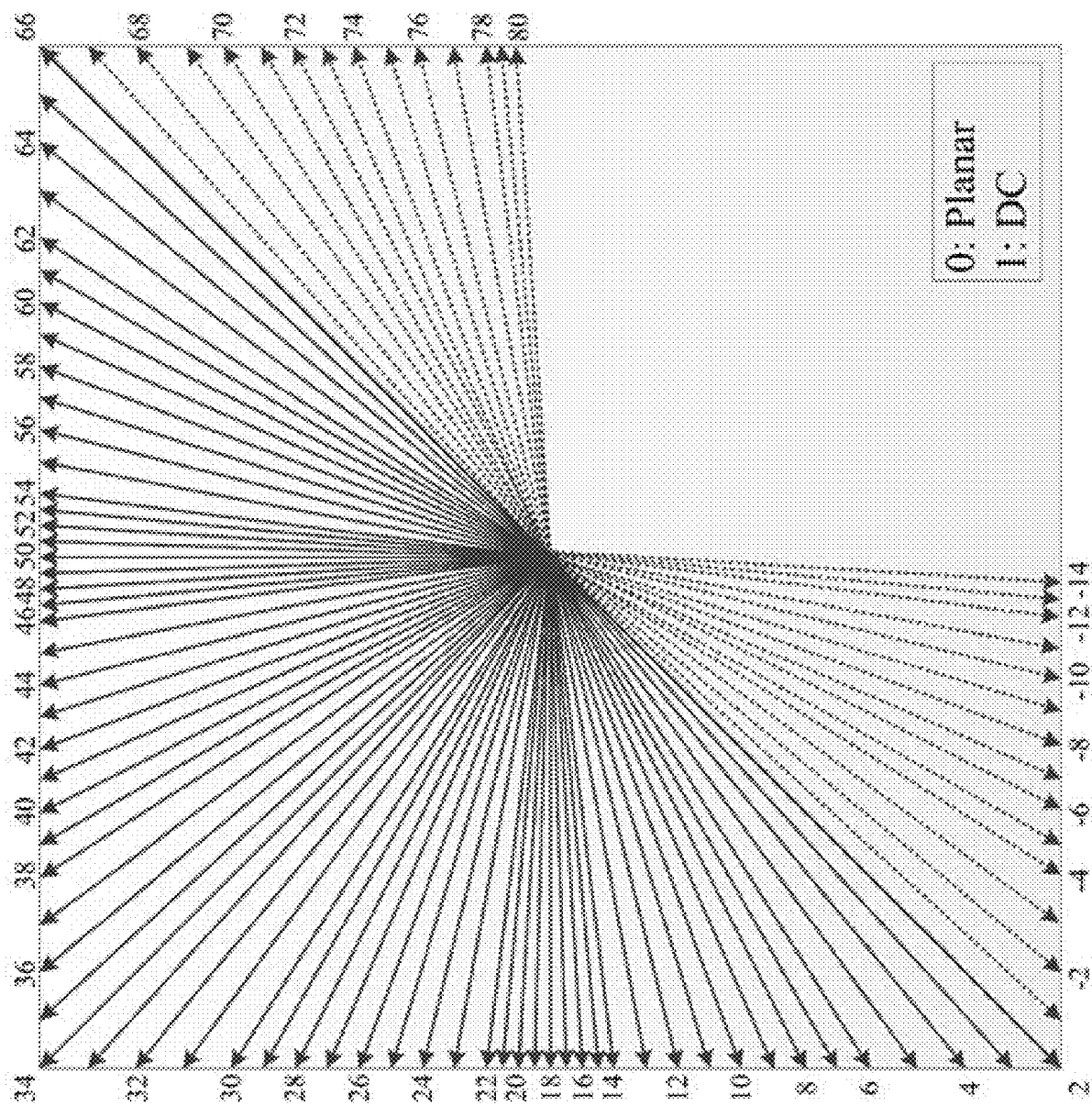
FIG. 16B shows an illustration of exemplary intra prediction directions and the corresponding intra prediction modes in accordance with an embodiment.

FIG. 16A shows an illustration of exemplary intra prediction directions and the intra prediction modes used in HEVC. In HEVC, there are total 35 intra prediction modes (mode 0 to mode 34). The mode 0 and mode 1 are non-directional modes, among which mode 0 is planar mode (labeled as Intra Planar in FIG. 16A) and mode 1 is DC mode (labeled as Intra_DC in FIG. 16A). The modes 2-34 are directional modes, among which mode 10 is a horizontal mode, mode 26 is a vertical mode, and mode 2, mode 18 and mode 34 are diagonal modes. In some examples, the intra prediction modes are signaled by three most probable modes (MPMs) and 32 remaining modes.

FIG. 16B shows an illustration of exemplary intra prediction directions and intra prediction modes in some examples (e.g., VVC). There are total 95 intra prediction modes (mode −14 to mode 80), among which mode 18 is a horizontal mode, mode 50 is a vertical mode, and mode 2, mode 34 and mode 66 are diagonal modes. Modes −1~−14 and Modes 67~80 are called wide-angle intra prediction (WAIP) modes.

Figure 17:
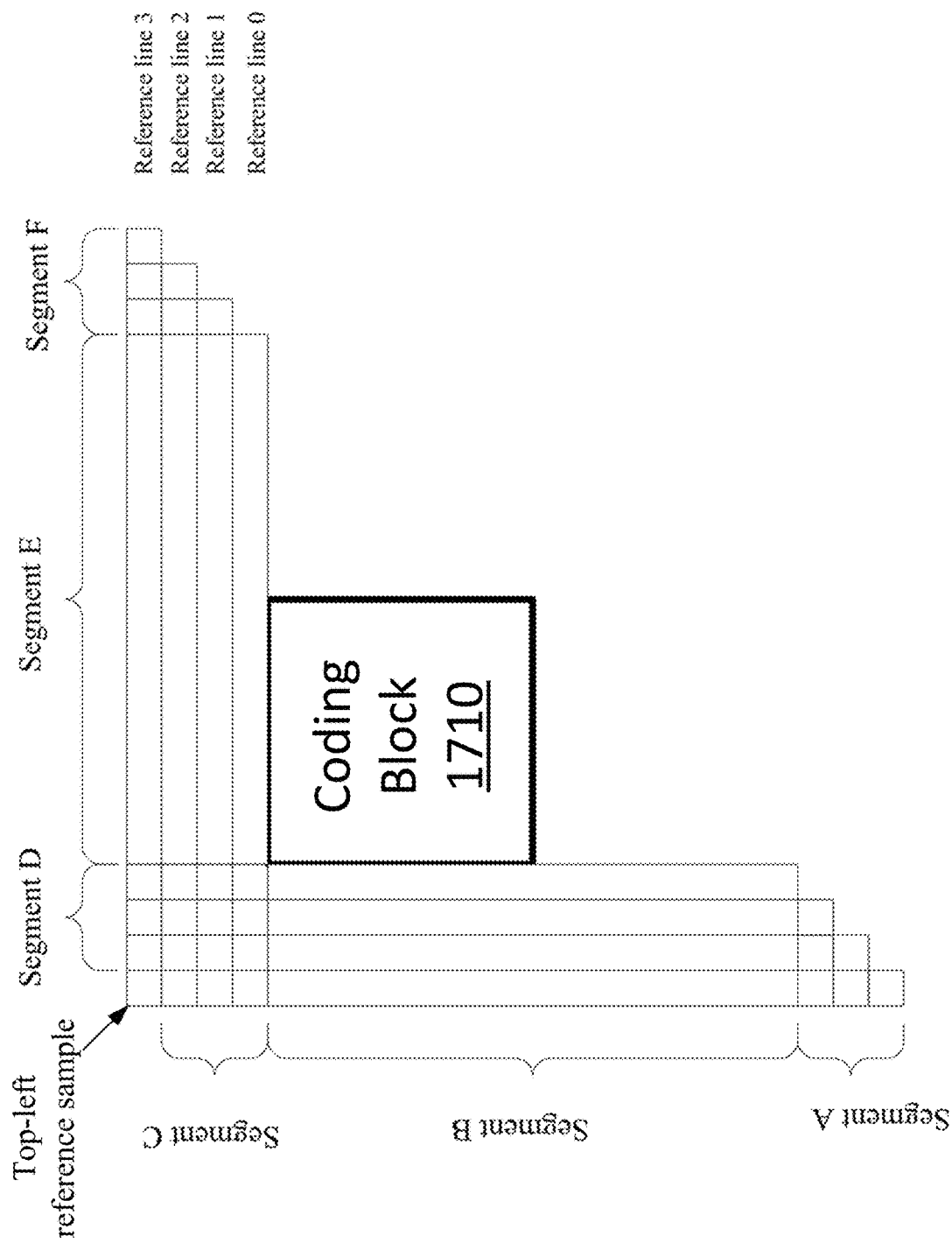
FIG. 17 shows an example of 4 reference lines for a coding block (1710) in accordance with an embodiment.

Multi-line intra prediction can use more reference lines for intra prediction. A reference line can include multiple samples in a picture. In an example, the reference line includes samples in a row and samples in a column. In an example, an encoder can determine and signal a reference line used to generate the intra predictor. An index (also referred to as a reference line index) indicating the reference line can be signaled before intra prediction mode(s). In an example, only the MPMs are allowed when a nonzero reference line index is signaled. FIG. 17 shows an example of 4 reference lines for a coding block (1710). In the example shown in FIG. 17, a reference line can include six segments, i.e., Segment A to F. The reference line 3 can include a top-left reference sample. The Segment A and F can be padded with closest samples from the Segment B and E, respectively. In some examples, such as in HEVC, only one reference line (e.g., the reference line 0 that is adjacent to the coding block (1710)) is used for intra prediction. In some examples, such as in VVC, multiple reference lines (e.g., the reference lines 0, 1, and 3) are used for intra prediction.

Intra sub-partition (ISP) coding mode can be used. In the ISP coding mode, a luma intra-predicted block can be divided vertically or horizontally into 2 or 4 sub-partitions depending on a block size.

Figure 19:
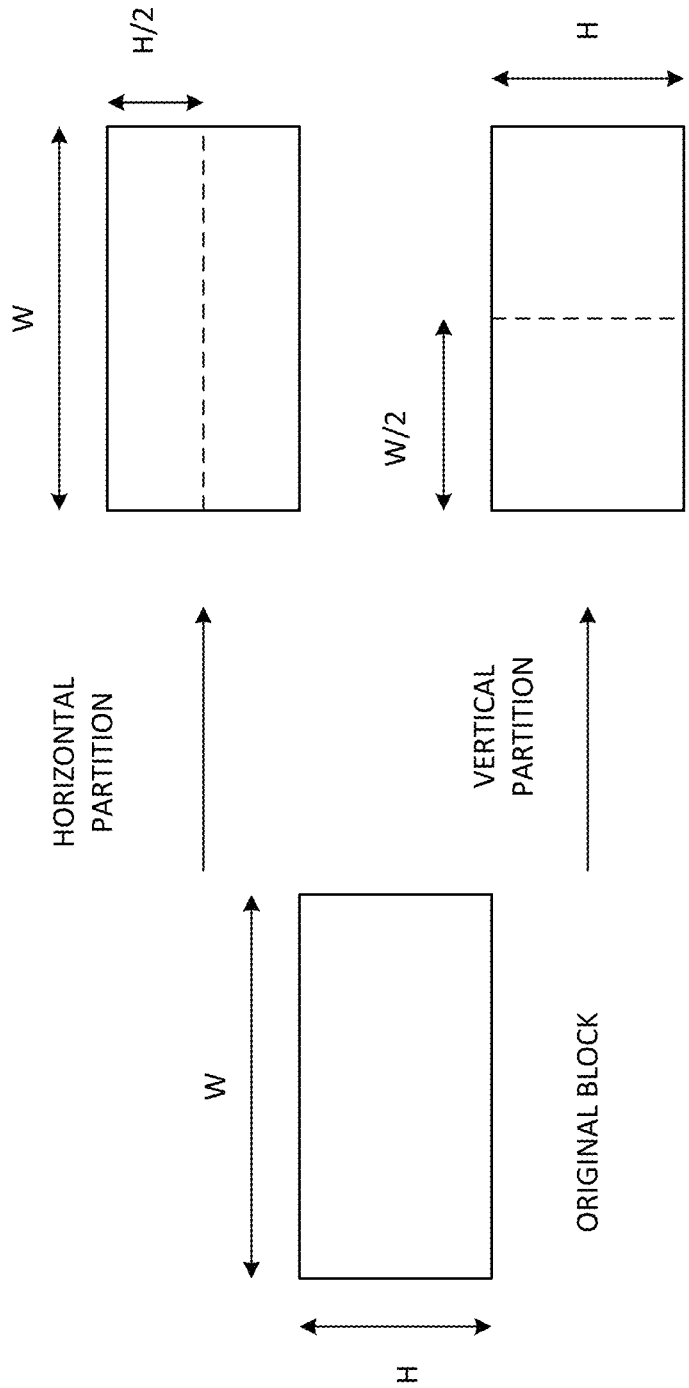
FIG. 19 shows an example of sub-partitions of a block having a size 4×8 or 8×4.
Figure 20:
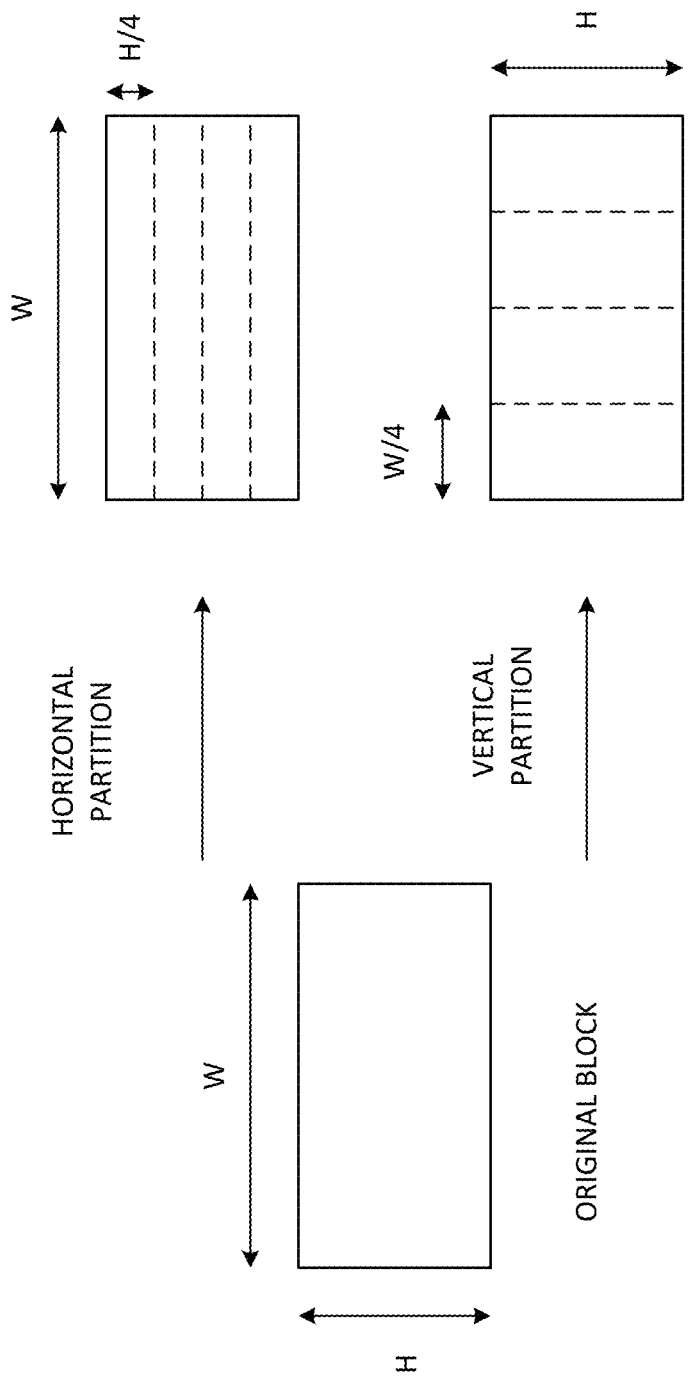
FIG. 20 shows another example of sub-partitions of a block having a size larger than 4×8 and 8×4.

FIG. 18 shows a Table 4 that associates a number of sub-partitions with a block size. For example, when the block size is 4×4, no partition is performed on the block in the ISP coding mode. When the block size is 4×8 or 8×4, then the block is partitioned into two sub-partitions in the ISP coding mode. For all other block sizes that are larger than 4×8 or 8×4, the block is partitioned into four sub-partitions. FIG. 19 shows an example of sub-partitions of a block having a size 4×8 or 8×4. FIG. 20 shows another example of sub-partitions of a block having a size other than 4×8, 8×4 and 4×4, for example, the block size is larger than 4×8 and 8×4. In an example, all of the sub-partitions satisfy a condition of having at least 16 samples. For chroma components, ISP is not applied.

In some examples, for each of the sub-partitions, the decoder can entropy decode coefficients that are send from the encoder to the decoder, then the decoder inverse quantizes and inverse transforms the coefficients to generate residuals (or residual data) for the sub-partition. Further, when the sub-partition is intra predicted by the decoder, the decoder can add the residuals with the intra prediction results to obtain the reconstructed samples of the sub-partition. Therefore, the reconstructed samples of each sub-partition can be available to generate the prediction of next sub-partition(s) to be reconstructed. The process described above can be repeated for the next sub-partition(s) and so on. All sub-partitions share the same intra prediction mode in an example. In some examples, in ISP, each sub-partition can be regarded as a TU, since the transform and reconstruction is performed individually for each sub-partition.

In some examples, the ISP algorithm is only tested with intra prediction modes that are part of the MPM list. For this reason, when a block uses ISP, then the MPM flag can be inferred to be one. Besides, when ISP is used for a certain block, then the MPM list can be modified to exclude the DC mode and to prioritize horizontal intra prediction modes for the ISP horizontal partition (or horizontal split) and vertical intra prediction modes for the vertical partition (or vertical split) in some examples.

FIGS. 21A-21D show examples of different YUV formats or chroma formats. Each chroma format may define a different down-sampling grid of different color components.

A secondary transform can refer to a NSST, a RST (or RT), or the like. A secondary transform index can refer to a NSST index, a RST index, or the like. In an example, the secondary transform index indicates a secondary transform (also referred to as a secondary transform candidate). The secondary transform index can be signaled at a CU level. For example, a NSST index or a RST index is signaled at a CU-level for a CU. Whether to signal the secondary transform index can depend on a number of non-zero coefficients of the CU. Thus, a decoder may loop all TUs included in the CU to determine the number of non-zero coefficients of the CU. In some embodiments, the process is relatively complicated.

In certain secondary transform (e.g., RST) designs, when a single splitting tree is used among different color components in a CU including, for example, a luma component and two chroma components, a number of non-zero coefficients in the CU can be counted to determine whether a secondary transform index is signaled or not. However, for a 4×N or N×4 luma block, a corresponding chroma block is 2×N/2 or N/2×2 in a YUV4:2:0 format. Thus, a secondary transform such as RST is not applied for the chroma block and a number of non-zero coefficients of the chroma block does not need to be counted.

In some examples, a second transform such as NSST or RST is not enabled for ISP. This can limit the full benefit of secondary transforms in terms of coding efficiency.

Embodiments described herein may be used separately or combined in any order. Further, the embodiments may be implemented by processing circuitry (e.g., one or more processors or one or more integrated circuits) in an encoder, a decoder, or the like. In one example, the one or more processors can execute a program that is stored in a non-transitory computer-readable medium. In some examples, a block may be a prediction block, a coding block, a CU, or the like.

In the disclosure, embodiments for DST-7 of an MTS candidate may be applicable to DST-4, and embodiments for DCT-8 of an MTS candidate may be applicable to DCT-4. Further, references to NSST may also apply to RST, which is an example of an alternative design of a non-separable secondary transform, in some embodiments.

A high-level syntax (HLS) element can refer to a Video Parameter Set (VPS), a Sequence Parameter Set (SPS), a Picture Parameter Set (PPS), a Slice header, a Tile header, a Tile group header, or the like. A CTU header can refer to syntax element(s) signaled for a CTU, e.g., as header information. In an example, a CTU size is a maximum CU size. A TU size may refer to a maximum width and/or a height, or an area of a TU.

In general, when a luma size (represented by luma samples) of a certain unit (e.g., a TU, a CU) is known, a corresponding chroma size that is specified by a number of chroma samples can be obtained. In an example, a YUV format of 4:2:0 is used and a CU has a CU size of 64×64 luma samples (or 64×64-L). Accordingly, the CU has a CU size of 32×32 chroma samples (or 32×32-C). The CU size can be referred to as 64×64-L, 32×32-C, or 64×64-L/32×32-C. The CU can include a luma block and two chroma blocks where the luma block has 64×64 luma samples and each of the two chroma blocks has 32×32 chroma samples. The description can be adapted for a TU. For purposes of brevity, the descriptions are omitted.

A TU size can be represented using luma samples in the TU. For example, a maximum TU size of M samples refers to a maximum TU size of M luma samples. Similarly, a CU size can be represented using luma samples in a CU. The TU size and the CU size can be represented using chroma samples or a combination of luma and chroma samples in other embodiments.

A unit size may refer to a width, a height, and/or an area of the unit. For example, a maximum TU size may refer to a width, a height, and/or an area of a maximum TU. In general, a TU, a CU, or the like can have any suitable shape, including a rectangular shape, a square shape, an 'L' shape, or any suitable shape. When the shape of the unit is irregular, such as an 'L' shape, the unit size can specify an area of the unit.

In some embodiments, a maximum TU size (also referred to as a maximum size of a TU) can be signaled in a coded video bitstream, such as in HLS (e.g., a SPS and a PPS). The maximum TU size can be signaled in terms of luma samples or chroma samples.

In some embodiments, a maximum TU size can be stored in an encoder and/or a decoder, thus the maximum TU size is not signaled. In one example, the maximum TU size can be stored in profile and/or level definitions. The maximum TU size can be stored in terms of luma or chroma samples.

According to aspects of the disclosure, whether a secondary transform is allowed for a CU can be determined based on a size of the CU (or a CU size). In an example, whether a secondary transform is allowed for the CU can be determined based on the CU size and a CU size threshold. When the CU size is less than or equal to the CU size threshold, the secondary transform is determined to be allowed, and when the CU size is larger than the CU size threshold, the secondary transform is determined not to be allowed. In an example, when the secondary transform is determined not to be allowed, a secondary transform index is not signaled. Thus, when a decoder determines that the secondary transform is not allowed, the decoder can also determine that the secondary transform index is not signaled. In an example, the CU size may refer to a width and/or a height of the CU, such as 64 samples. In an example, the CU size may refer to an area of the CU, such as 64×64 samples.

In an example, the CU size threshold (e.g., CU width threshold, CU height threshold, or CU area threshold) is limited to be not larger than a maximum size of a TU in the CU. The maximum size of the TU can be signaled in the HLS. The maximum size of the TU can also be pre-defined and stored in a decoder.

As described above, in some examples, a decoder may loop TUs in a CU to determine a number of non-zero coefficients of the CU and then determine whether a secondary transform index is signaled. According to aspects of the disclosure, instead of counting the number of non-zero coefficients of the CU, whether the secondary transform index is signaled can be determined based on a last position of non-zero transform coefficients (or a last non-zero coefficient position) of a first CB of the CU. The first CB can be any suitable block, such as a luma block, a chroma block, or the like, that is in the CU. The secondary transform index can indicate a selected secondary transform for a second CB in the CU.

According to aspects of the disclosure, whether to perform the secondary transform on the second CB in the CU can be determined based on whether the secondary transform index is determined to be signaled. Further, when the secondary transform is determined to be performed, a sample in the second CB can be reconstructed after the secondary transform indicated by the secondary transform index is performed on the second CB. Alternatively, when the secondary transform is determined not to be performed, the sample in the second CB can be reconstructed without performing the secondary transform on the second CB. The second CB can be any suitable block, such as a luma block, a chroma block, or the like, that is in the CU. In an example, the first CB is the second CB. In another example, the first CB is different from the second CB.

In an example, the CU includes a luma block. The first CB is the luma block. The last position is a last non-zero luma coefficient position for the luma block. Accordingly, whether the secondary transform index is signaled is determined based on the last luma position. The second CB is also the luma block or the first CB.

In some embodiments, additional information can be included to determine whether the secondary transform index is signaled, as described below.

In an example, the CU includes a luma block and a chroma block. The first CB is the luma block. The last position is a last non-zero luma coefficient position—for the luma block. The additional information can include a last non-zero chroma coefficient position for the chroma block. Accordingly, whether the secondary transform index is signaled is determined based on the last non-zero luma coefficient position and the last non-zero chroma coefficient position for the chroma block. The second CB can be one of: the luma block and the chroma block.

In an example, the CU includes a luma block and two chroma blocks (e.g., a chroma block I and a chroma block II). The first CB is the luma block. The last position is a last non-zero luma coefficient position for the luma block. The additional information can include a last non-zero chroma coefficient position I—for the chroma block I and a last non-zero chroma coefficient position II—for the chroma block II. Accordingly, whether the secondary transform index is signaled can be determined based on the last non-zero luma coefficient position, the last non-zero chroma coefficient position I of non-zero transform coefficients for the chroma block I, and the last non-zero chroma coefficient position II of non-zero transform coefficients for the chroma block II. The second CB can be one of: the luma block, the chroma block I, and the chroma block II.

As described above, whether the secondary transform index is signaled can be determined based on the last non-zero coefficient position of the first CB of the CU. The last non-zero coefficient position can include a horizontal component (e.g., last_pos_x) and a vertical component (e.g., last_pos_y), and thus whether the secondary transform index is signaled can be determined based on the horizontal component and/or the vertical component. The horizontal component and the vertical component can be an integer that is 0 or larger than 0. The vertical component can be an integer that is 0 or larger than 0.

In an embodiment, the horizontal component can be compared with a first threshold and/or the vertical component can be compared with a second threshold. The first threshold can be identical to the second threshold. Alternatively, the first threshold can be different from the second threshold. The first threshold and/or the second threshold can be a positive integer, such as 1, 2, 3, or the like.

In an example, whether the horizontal component is less than the first threshold and whether the vertical component is less than the second threshold can be determined. When the horizontal component is determined to be less than the first threshold and the vertical component is determined to be less than the second threshold, the secondary transform index can be determined not to be signaled.

In an example, whether the horizontal component is larger than or equal to the first threshold can be determined. Further, whether the vertical component is larger than or equal to the second threshold can be determined. When the horizontal component is determined to be larger than or equal to the first threshold and the vertical component is determined to be larger than or equal to the second threshold, the secondary transform index can be determined to be signaled.

In an embodiment, whether a sum of the horizontal component and the vertical component of the last position is less than a third threshold can be determined. When the sum is determined to be less than the third threshold, the secondary transform index can be determined not to be signaled. The third threshold can be a positive integer, such as 1, 2, 3, or the like. When the sum is determined to be larger than or equal to the third threshold, the secondary transform index can be determined to be signaled.

In an embodiment, whether a minimum one of the horizontal component and the vertical component is less than a fourth threshold can be determined. When the minimum one of the horizontal component and the vertical component is determined to be less than the fourth threshold, the secondary transform index is determined not to be signaled. The fourth threshold can be a positive integer, such as 1, 2, 3, or the like.

In an embodiment, whether a maximum one of the horizontal component and the vertical component is less than a fifth threshold can be determined. When the maximum one is determined to be less than the fifth threshold, the secondary transform index is determined not to be signaled. The fifth threshold can be a positive integer, such as 1, 2, 3, or the like. The fourth threshold can be identical to the fifth threshold. Alternatively, the fourth threshold can be different from the fifth threshold.

In an embodiment, the first CB is a luma block in the CU. Further, the CU includes a chroma block. However, whether the secondary transform index is signaled is determined based on only the last non-zero luma coefficient position of the luma block of the CU. Therefore, a last non-zero chroma coefficient position for the chroma block is not considered in determining whether the secondary transform index is signaled.

In an embodiment, the CU includes the luma block and the chroma block as described above. Whether the secondary transform index is signaled is determined based on the last non-zero luma coefficient position for the luma block and the last non-zero chroma coefficient position for the chroma block. Similarly, the last non-zero luma coefficient position can include a luma horizontal component and a luma vertical component, and the last non-zero chroma coefficient position can include a chroma horizontal component and a chroma vertical component. Thus, whether the secondary transform index is signaled can be determined based on the luma horizontal component, the luma vertical component, the chroma horizontal component, and/or the chroma vertical component.

In an embodiment, one or more of the respective horizontal component and the vertical component of each of the last non-zero luma and chroma coefficient positions can be compared with a respective threshold, such as 1, 2, 3, or the like. In an example, whether the one or more of the respective horizontal component and the vertical component of each of the last non-zero luma and chroma coefficient positions is less than the respective threshold can be determined. When the one or more of the respective horizontal component and the vertical component of each of the last non-zero luma and chroma coefficient positions is less than the respective threshold, the secondary transform index can be determined not to be signaled.

In an embodiment, a horizontal sum is obtained by summing the luma horizontal component and the chroma horizontal component, and a vertical sum is obtained by summing the luma vertical component and the chroma vertical component. Whether each of the horizontal sum and the vertical sum is less than a respective threshold can be determined. When each of the horizontal sum and the vertical sum is less than the respective threshold, the secondary transform index can be determined not to be signaled.

In an example, a first sum of the luma horizontal component and the luma vertical component is determined, and a second sum of the chroma horizontal component and the chroma vertical component is determined. Whether each of the first sum and the second sum is less than a respective threshold can be determined. When each of the first sum and the second sum is determined to be less than the respective threshold, the secondary transform index can be determined not to be signaled.

In an embodiment, a total sum is obtained by summing the first sum and the second sum, when the total sum is determined to be less than a threshold, the secondary transform index can be determined not to be signaled.

In an embodiment, a first minimum of the luma horizontal component and the luma vertical component is determined, and a second minimum of the chroma horizontal component and the chroma vertical component is determined. Whether each of the first minimum and the second minimum is less than a respective threshold can be determined. When each of the first minimum and the second minimum is determined to be less than the respective threshold, the secondary transform index can be determined not to be signaled. The above description can be adapted for using a first maximum of the luma horizontal component and the luma vertical component and a second maximum of the chroma horizontal component and the chroma vertical component to determine whether the secondary transform index is signaled.

Similarly, a minimum of the horizontal sum and the vertical sum can be used to determine whether the secondary transform index is signaled or not. A maximum of the horizontal sum and the vertical sum can be used to determine whether the secondary transform index is signaled or not.

According to aspects of the disclosure, when determining a number of non-zero transform coefficients for a CU, non-zero transform coefficients in a CB of the CU can be counted when a size of the CB (also referred to as a CB size) is larger than or equal to a size threshold, such as 4. In an example, when the CB size is less than the size threshold, the non-zero transform coefficients in the CB are not counted, i.e., are not included in the number of non-zero transform coefficients for the CU. The size threshold can be predefined and stored in a decoder. The size threshold can be signaled explicitly, for example, from an encoder to a decoder. Further, when the number of non-zero transform coefficients in the CU is less than a number threshold, a secondary transform index can be determined not to be signaled.

In an example, a color format for the CU is YUV 4:2:0. The CU includes a luma block and two chroma blocks that are co-located with the luma block. The size threshold is 4. When the luma block has a size of 4×N or N×4 where N can refer to a width or a height of the luma block and can be larger than or equal to 4, the two chroma blocks have a size of 2×N/2 or N/2×2. In an example, N is a positive even number. The number of non-zero transform coefficients for the CU is determined from only the luma block without considering the two chroma blocks. A width or a height of each of the two chroma blocks is less than the size threshold. In another example, the size threshold is 4×4, and the CB size of 2×N/2 or N/2×2 is also less than the size threshold where N can be a positive even number. A secondary transform is not performed on the two chroma blocks.

In an example, a color format for the CU is YUV 4:2:2. The CU includes a luma block and two chroma blocks that are co-located with the luma block. The size threshold is 4. When the luma block has a size of 4×N where N is larger than or equal to 4, the two chroma blocks have a size of 2×N. The number of non-zero transform coefficients for the CU is determined from only the luma block without considering the two chroma blocks. A width (e.g., 2) of each of the two chroma blocks is less than the size threshold. A secondary transform is not performed on the two chroma blocks.

A secondary transform can be performed on a first coefficient block (such as a TB) to obtain a 4×2 (or 2×4) first sub-block that includes at least one non-zero coefficient. For example, a RST is applied on a 4×4 first TB (e.g., the first coefficient block) to obtain a second TB that includes a first sub-block and a second sub-block. The first sub-block of 4×2 (or 2×4) includes at least one non-zero coefficient. Coefficients in the second sub-block of 4×2 (or 2×4) are regarded as 0. Thus, a 4×2 (or 2×4) sub-block scanning of the first sub-block (i.e., the 4×2 (or 2×4) coefficient scanning order) is applied for entropy coding the second TB. In an example, the 4×2 (or 2×4) coefficient scanning order is a same scanning order that is applied for entropy coding of a 4×2 (or 2×4) chroma block.

Similarly, a secondary transform can be performed on a first coefficient block (such as a TB) to obtain an 8×4 (or 4×8) first sub-block that includes at least one non-zero coefficient, for example, when the first coefficient block is larger than 8×4 (or 4×8). For example, a RST is applied on a 8×8 first TB (e.g., the first coefficient block) to obtain a second TB that includes a first sub-block and a second sub-block. The first sub-block of 8×4 (or 4×8) includes at least one non-zero coefficient. Coefficients in the second sub-block of 8×4 (or 4×8) are regarded as 0. Thus, an 8×4 (or 4×8) block scanning of the first sub-block (i.e., the 8×4 (or 4×8) coefficient scanning order) is applied for entropy coding the second TB. In an example, the 8×4 (or 4×8) coefficient scanning order is a same scanning order that is applied for entropy coding of a 8×4 (or 4×8) chroma block.

Figure 22:
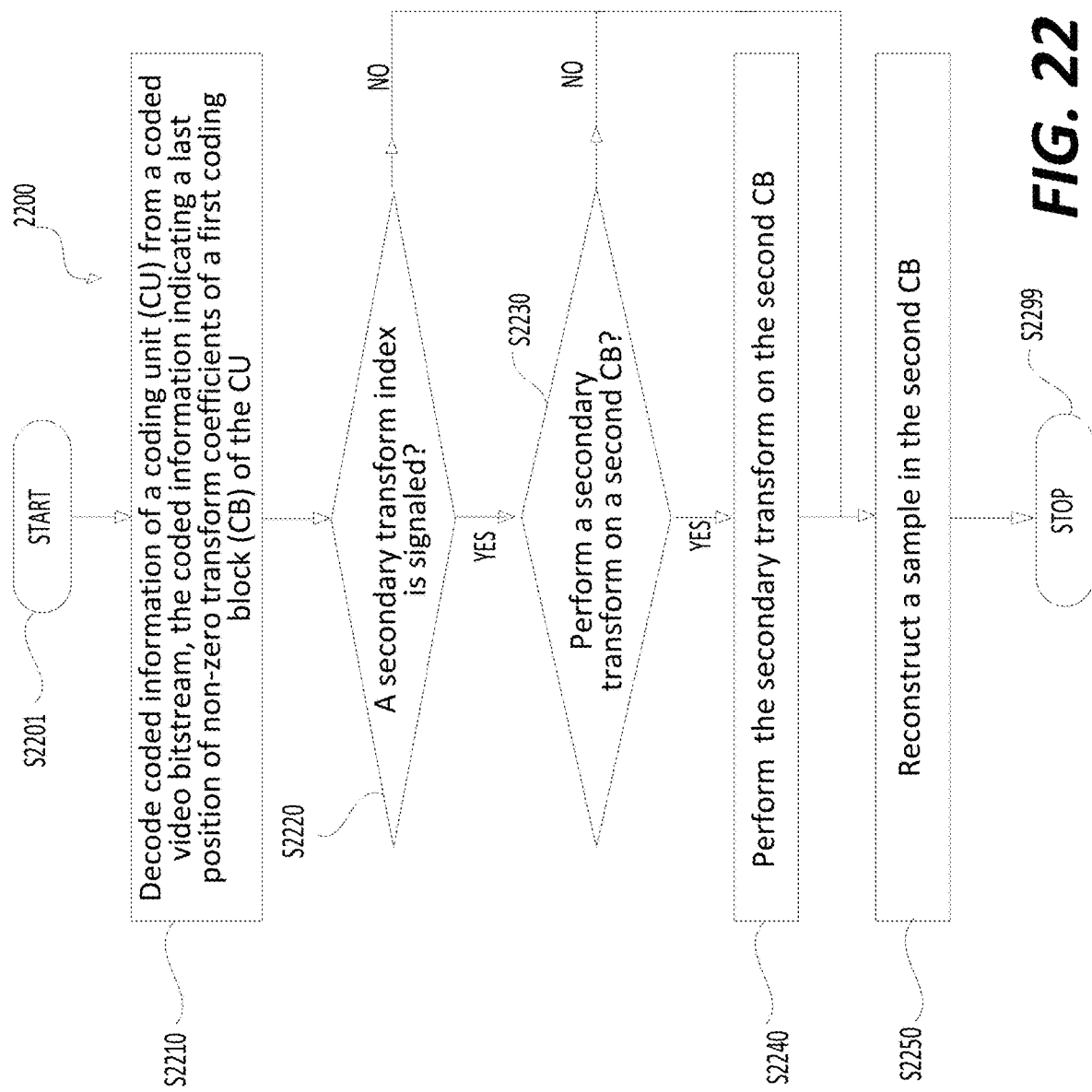
FIG. 22 shows a flow chart outlining a process (2200) in accordance with an embodiment.

FIG. 22 shows a flow chart outlining a process (2200) according to an embodiment of the disclosure. The process (2200) can be used in the reconstruction of a block coded in intra mode, so to generate a prediction block for the block under reconstruction. In some examples, the process (2200) can be used in the reconstruction of a block coded in inter mode. In various embodiments, the process (2200) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2200) is implemented in software instructions, thus when the processing circuitry executes the software instructions, the processing circuitry performs the process (2200). The process starts at (S2201) and proceeds to (S2210).

At (S2210), coded information of a CU can be decoded from a coded video bitstream. The coded information can indicate a last position of non-zero transform coefficients (or a last non-zero coefficient position) of a first CB of the CU. In an example, the CU can include a luma block and a chroma block. The first CB can be the luma block or the chroma block.

At (S2220), whether a secondary transform index is signaled in the coded information can be determined based on the last non-zero coefficient position, as described above. The secondary transform index can indicate a secondary transform to be performed on a second CB in the CU. The second CB can be the luma block or the chroma block.

In an example, the last non-zero coefficient position can include a horizontal component and a vertical component, and whether the secondary transform index is signaled in the coded information can be determined based on the horizontal component and/or the vertical component. As described above, additional information can be used to determine whether the secondary transform index is signaled and step (S2220) can be suitably adapted to include the additional information. In an example, when the secondary transform index is determined to be signaled, the process (2200) proceeds to (S2230). Otherwise, the process (2200) proceeds to (S2250)

At (S2230), whether to perform the secondary transform on the second CB can be determined based on whether the secondary transform index is determined to be signaled in the coded information. In some examples, when the secondary transform index is determined to be signaled, the secondary transform is determined to be performed. When the secondary transform is determined to be performed, the process (2200) proceeds to (S2240). Otherwise, the process (2200) proceeds to (S2250).

At (S2240), the secondary transform indicated by the secondary transform index is performed on the second CB. The secondary transform can be NSST. The secondary transform can be RST including a zero-out method. For example, when the second CB is 8×8, RST is applied on the second CB to obtain a transformed block that includes a first sub-block of 8×4 and a second sub-block of 8×4. The first sub-block includes at least one non-zero coefficient. Coefficients in the second sub-block are not calculated and regarded as 0.

At (S2250), a sample in the second CB can be reconstructed. The process (2200) then proceeds to (S2299) and terminates.

The process (2200) can be suitably adapted as described above. For example, one or more steps can be modified, omitted, or combined. In an example, steps (S2220) and (S2230) are combined. Additional step(s) can also be added. An order that the process (2200) is executed can also be modified.

Figure 23:
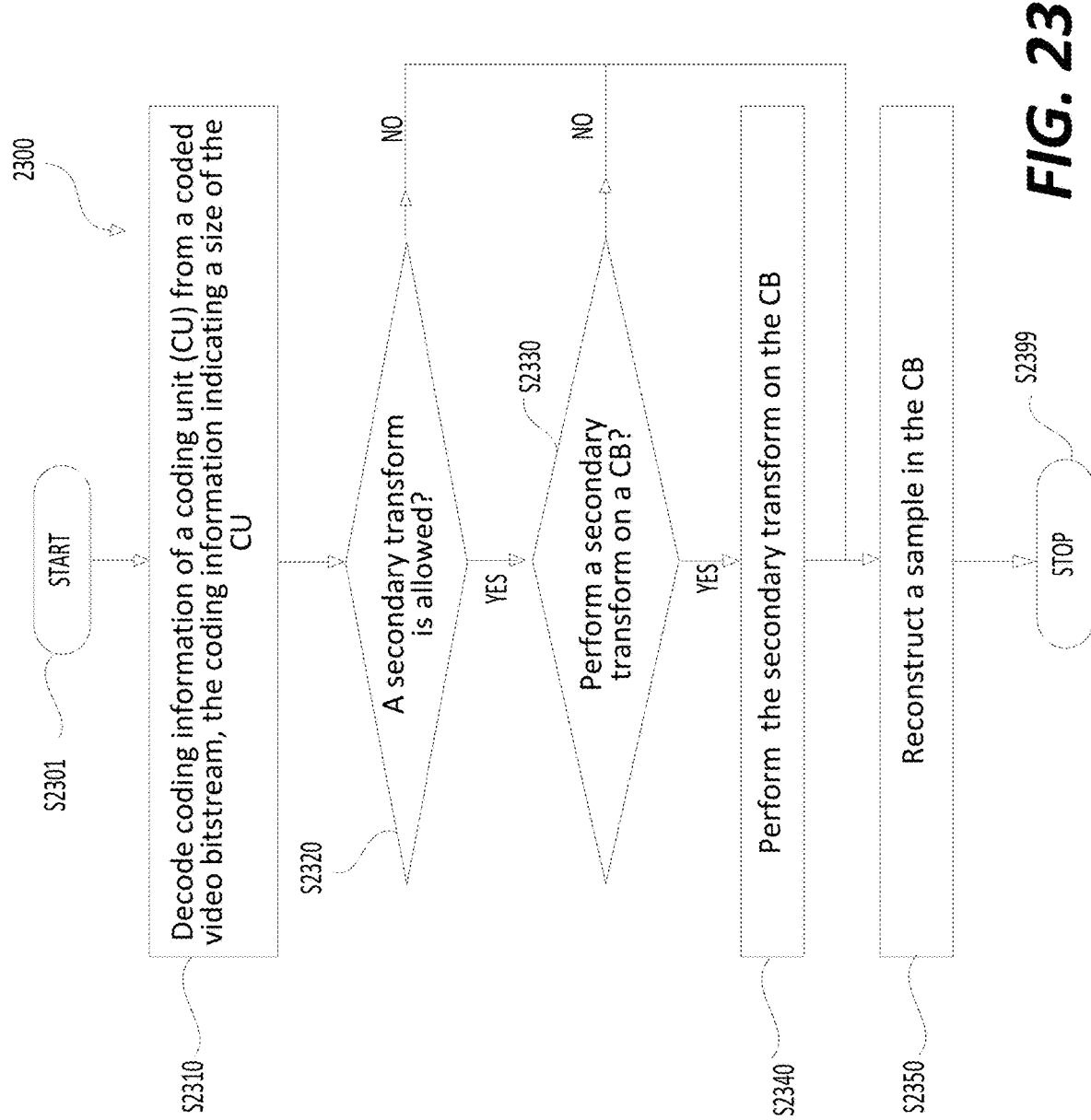
FIG. 23 shows a flow chart outlining a process (2300) in accordance with an embodiment.

FIG. 23 shows a flow chart outlining a process (2300) according to an embodiment of the disclosure. The process (2300) can be used in the reconstruction of a block coded in intra mode, so to generate a prediction block for the block under reconstruction. In some examples, the process (2300) can be used in the reconstruction of a block coded in inter mode. In various embodiments, the process (2300) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2300) is implemented in software instructions, thus when the processing circuitry executes the software instructions, the processing circuitry performs the process (2300). The process starts at (S2301) and proceeds to (S2310).

At (S2310), coding information of a CU can be decoded from a coded video bitstream where the coding information indicates a size of the CU.

At (S2320), whether a secondary transform is allowed can be determined based on the size of the CU and a CU size threshold. When the size of the CU is less than or equal to the CU size threshold, the secondary transform is determined to be allowed. The process (2300) proceeds to (S2330). When the size of the CU is larger than the CU size threshold, the secondary transform is determined not to be allowed and the process (2300) proceeds to (S2350).

At (S2330), whether to perform a secondary transform on a CB in the CU can be determined, for example, based on whether the secondary transform index is signaled, as described above. When the secondary transform is determined to be performed, the process (2300) proceeds to (S2340). Otherwise, the process (2300) proceeds to (S2350).

At (S2340), the secondary transform indicated by the secondary transform index is performed on the CB, similar to step (S2240).

At (S2350), a sample in the CB can be reconstructed. The process (2300) then proceeds to (S2399) and terminates.

The process (2300) can be suitably adapted. For example, one or more steps can be modified. Additional step(s) can also be added.

The process (2200) and process (2300) can be suitably combined. For example, (S2310) and (S2320) can be implemented, followed by (S2210)-(S2250).

The techniques described above, can be implemented as computer software using computer-readable instructions and physically stored in one or more computer-readable media. For example, FIG. 24 shows a computer system (2400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 24:
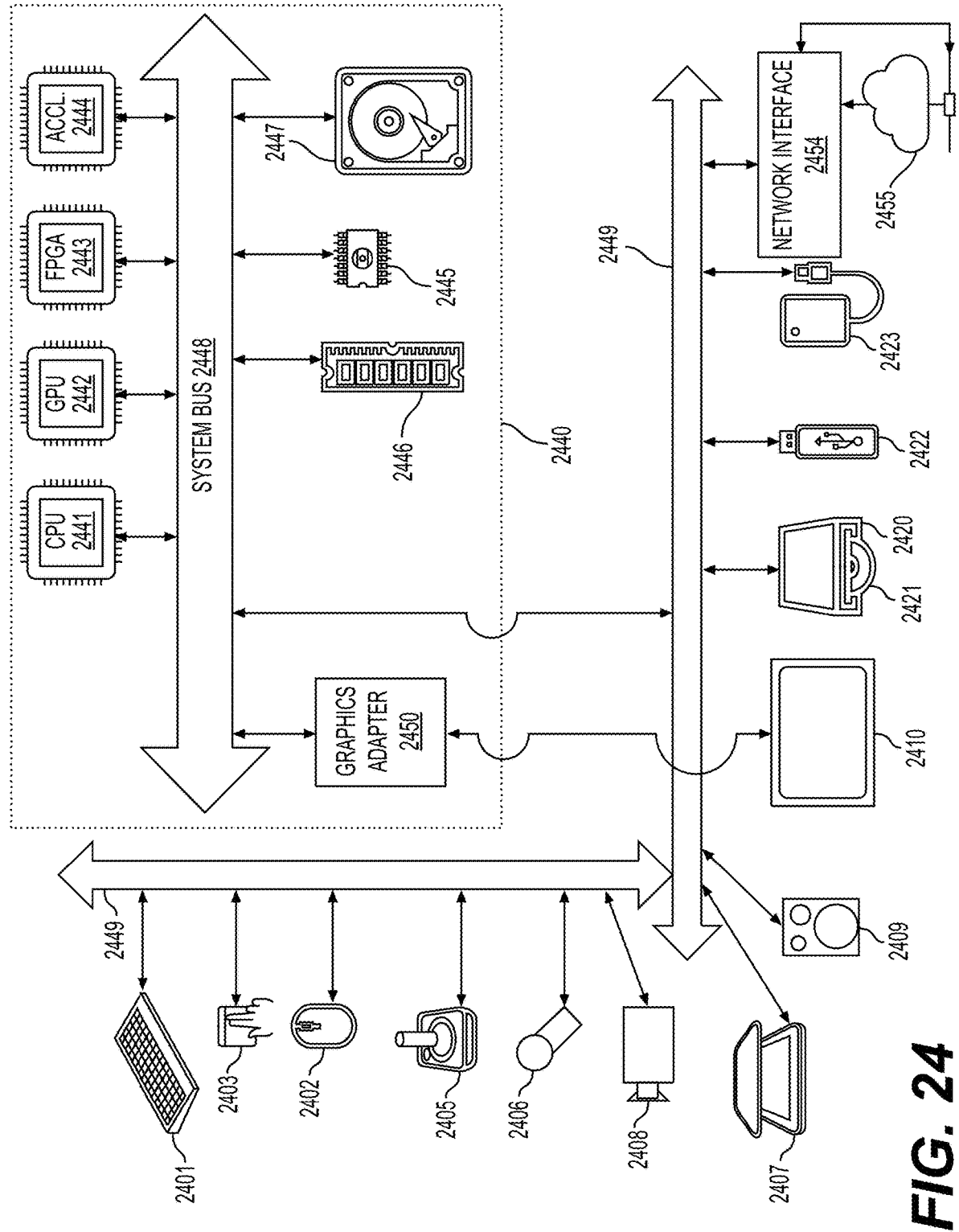
FIG. 24 is a schematic illustration of a computer system in accordance with an embodiment.

The components shown in FIG. 24 for computer system (2400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2400).

Computer system (2400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2401), mouse (2402), trackpad (2403), touch screen (2410), data-glove (not shown), joystick (2405), microphone (2406), scanner (2407), camera (2408).

Computer system (2400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2410), data-glove (not shown), or joystick (2405), but there can also be tactile feedback devices that do not serve as input devices), audio output devices (such as: speakers (2409), headphones (not depicted)), visual output devices (such as screens (2410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2400) can also include human accessible storage devices and their associated media such as optical media including CD/DVD ROM/RW (2420) with CD/DVD or the like media (2421), thumb-drive (2422), removable hard drive or solid state drive (2423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2400) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2449) (such as, for example USB ports of the computer system (2400)); others are commonly integrated into the core of the computer system (2400) by attachment to a system bus as described below (for example Ethernet interface into a PC computer system or cellular network interface into a smartphone computer system). Using any of these networks, computer system (2400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2440) of the computer system (2400).

The core (2440) can include one or more Central Processing Units (CPU) (2441), Graphics Processing Units (GPU) (2442), specialized programmable processing units in the form of Field Programmable Gate Areas (FPGA) (2443), hardware accelerators for certain tasks (2444), and so forth. These devices, along with Read-only memory (ROM) (2445), Random-access memory (2446), internal mass storage such as internal non-user accessible hard drives, SSDs, and the like (2447), may be connected through a system bus (2448). In some computer systems, the system bus (2448) can be accessible in the form of one or more physical plugs to enable extensions by additional CPUs, GPU, and the like. The peripheral devices can be attached either directly to the core's system bus (2448), or through a peripheral bus (2449). Architectures for a peripheral bus include PCI, USB, and the like.

CPUs (2441), GPUs (2442), FPGAs (2443), and accelerators (2444) can execute certain instructions that, in combination, can make up the aforementioned computer code. That computer code can be stored in ROM (2445) or RAM (2446). Transitional data can be also be stored in RAM (2446), whereas permanent data can be stored for example, in the internal mass storage (2447). Fast storage and retrieve to any of the memory devices can be enabled through the use of cache memory, that can be closely associated with one or more CPU (2441), GPU (2442), mass storage (2447), ROM (2445), RAM (2446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2400), and specifically the core (2440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2440) that are of non-transitory nature, such as core-internal mass storage (2447) or ROM (2445). The software implementing various embodiments of the present disclosure can be stored in such devices and executed by core (2440). A computer-readable medium can include one or more memory devices or chips, according to particular needs. The software can cause the core (2440) and specifically the processors therein (including CPU, GPU, FPGA, and the like) to execute particular processes or particular parts of particular processes described herein, including defining data structures stored in RAM (2446) and modifying such data structures according to the processes defined by the software. In addition or as an alternative, the computer system can provide functionality as a result of logic hardwired or otherwise embodied in a circuit (for example: accelerator (2444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX I

4×4 transform

{ 64, 64, 64, 64 }
{ 83, 36, −36, −83 }
{ 64, −64, −64, 64 }
{ 36, −83, 83, −36 }

8×8 transform

{ 64, 64, 64, 64, 64, 64, 64, 64 }
{ 89, 75, 50, 18, −18, −50, −75, −89 }
{ 83, 36, −36, −83, −83, −36, 36, 83 }
{ 75, −18, −89, −50, 50, 89, 18, −75 }
{ 64, −64, −64, 64, 64, −64, −64, 64 }
{ 50, −89, 18, 75, −75, −18, 89, −50 }
{ 36, −83, 83, −36, −36, 83, −83, 36 }
{ 18, −50, 75, −89, 89, −75, 50, −18 }

16×16 transform

{ 64 64 64 64 64 64 64 64 64 64 64 64 64 64 64 64 }
{ 90 87 80 70 57 43 25 9 −9 −25 −43 −57 −70 −80 −87 −90 }
{ 89 75 50 18 −18 −50 −75 −89 −89 −75 −50 −18 18 50 75 89 }
{ 87 57 9 −43 −80 −90 −70 −25 25 70 90 80 43 −9 −57 −87 }
{ 83 36 −36 −83 −83 −36 36 83 83 36 −36 −83 −83 −36 36 83 }
{ 80 9 −70 −87 −25 57 90 43 −43 −90 −57 25 87 70 −9 −80 }
{ 75 −18 −89 −50 50 39 18 −75 −75 18 89 50 −50 −89 −18 75 }
{ 70 −43 −37 9 90 25 −80 −57 57 80 −25 −90 −9 87 43 −70 }
{ 64 −64 −64 64 64 −64 −64 64 64 −64 −64 64 64 −64 −64 64 }
{ 57 −80 −25 90 −9 −87 43 70 −70 −43 87 9 −90 25 80 −57 }
{ 50 −89 18 75 −75 −18 89 −50 −50 89 −18 −75 75 18 −89 50 }
{ 43 −90 57 25 −87 70 9 −80 80 −9 −70 87 −25 −57 90 −43 }
{ 36 −83 83 −36 −36 83 −83 36 36 −83 83 −36 −36 83 −83 36 }
{ 25 −70 90 −80 43 9 −57 87 −87 57 −9 −43 80 −90 70 −25 }
{ 18 −50 75 −89 89 −75 50 −18 −18 50 −75 89 −89 75 −50 18 }
{ 9 −25 43 −57 70 −80 87 −90 90 −87 80 −70 57 −43 25 −9 }

32×32 transform

{ 64 64 64 64 64 64 64 64 64 64 64 64 64 64 64 64 64 64 64 64 64 64 64 64 64 64 64 64 64 64 64 64 }
{ 90 90 88 85 82 78 73 67 61 54 46 38 31 22 13 4 −4 −13 −22 −31 −38 −46 −54 −61 −67 −73 −78 −82 −85 −88 −90 −90 }
{ 90 87 80 70 57 43 25 9 −9 −25 −43 −57 −70 −80 −87 −90 −90 −87 −80 −70 −57 −43 −25 −9 9 25 43 57 70 80 87 90 }
{ 90 82 67 46 22 −4 −31 −54 −73 −85 −90 −88 −78 −61 −38 −13 13 38 61 78 88 90 85 73 54 31 4 −22 −46 −67 −82 −90 }
{ 89 75 50 18 −18 −50 −75 −89 −89 −75 −50 −18 18 50 75 89 89 75 50 18 −18 −50 −75 −89 −89 −75 −50 −18 18 50 75 89 }
{ 88 67 31 −13 −54 −82 −90 −78 −46 −4 38 73 90 85 61 22 −22 −61 −85 −90 −73 −38 4 46 78 90 82 54 13 −31 −67 −88 }
{ 87 57 9 −43 −80 −90 −70 −25 25 70 90 80 43 −9 −57 −87 −87 −57 −9 43 80 90 70 25 −25 −70 −90 −80 −43 9 57 87 }
{ 85 46 −13 −67 −90 −73 −22 38 82 88 54 −4 −61 −90 −78 −31 31 78 90 61 4 −54 −88 −82 −38 22 73 90 67 13 −46 −85 }
{ 83 36 −36 −83 −83 −36 36 83 83 36 −36 −83 −83 −36 36 83 83 36 −36 −83 −83 −36 36 83 83 36 −36 −83 −83 −36 36 83 }
{ 82 22 −54 −90 −61 13 78 85 31 −46 −90 −67 4 73 88 38 −38 −88 −73 −4 67 90 46 −31 −85 −78 −13 61 90 54 −22 −82 }
{ 80 9 −70 −87 −25 57 90 43 −43 −90 −57 25 87 70 −9 −80 −80 −9 70 87 25 −57 −90 −43 43 90 57 −25 −87 −70 9 80 }
{ 78 −4 −82 −73 13 85 67 −22 −88 −61 31 90 54 −38 −90 −46 46 90 38 −54 −90 −31 61 88 22 −67 −85 −13 73 82 4 −78 }
{ 75 −18 −89 −50 50 89 18 −75 −75 18 89 50 −50 −89 −18 75 75 −18 −89 −50 50 89 18 −75 −75 18 89 50 −50 −89 −18 75 }
{ 73 −31 −90 −22 78 67 −38 −90 −13 82 61 −46 −88 −4 85 54 −54 −85 4 88 46 −61 −82 13 90 38 −67 −78 22 90 31 −73 }
{ 70 −43 −87 9 90 25 −80 −57 57 80 −25 −90 −9 87 43 −70 −70 43 87 −9 −90 −25 80 57 −57 −80 25 90 9 −87 −43 70 }
{ 67 −54 −78 38 85 −22 −90 4 90 13 −88 −31 82 46 −73 −61 61 73 −46 −82 31 88 −13 −90 −4 90 22 −85 −38 78 54 −67 }
{ 64 −64 −64 64 64 −64 −64 64 64 −64 −64 64 64 −64 −64 64 64 −64 −64 64 64 −64 −64 64 64 −64 −64 64 64 −64 −64 64 }
{ 61 −73 −46 82 31 −88 −13 90 −4 −90 22 85 −38 −78 54 67 −67 −54 78 38 −85 −22 90 4 −90 13 88 −31 −82 46 73 −61 }
{ 57 −80 −25 90 −9 −87 43 70 −70 −43 87 9 −90 25 80 −57 −57 80 25 −90 9 87 −43 −70 70 43 −87 −9 90 −25 −80 57 }
{ 54 −85 −4 88 −46 −61 82 13 −90 38 67 −78 −22 90 −31 −73 73 31 −90 22 78 −67 −38 90 −13 −82 61 46 −88 4 85 −54 }
{ 50 −89 18 75 −75 −18 89 −50 −50 89 −18 −75 75 18 −89 50 50 −89 18 75 −75 −18 89 −50 −50 89 −18 −75 75 18 −89 50 }
{ 46 −90 38 54 −90 31 61 −88 22 67 −85 13 73 −82 4 78 −78 −4 82 −73 −13 85 −67 −22 88 −61 −31 90 −54 −38 90 −46 }
{ 43 −90 57 25 −87 70 9 −80 80 −9 −70 87 −25 −57 90 −43 −43 90 −57 −25 87 −70 −9 80 −80 9 70 −87 25 57 −90 43 }
{ 38 −88 73 −4 −67 90 −46 −31 85 −78 13 61 −90 54 22 −82 82 −22 −54 90 −61 −13 78 −85 31 46 −90 67 4 −73 88 −38 }
{ 36 −83 83 −36 −36 83 −83 36 36 −83 83 −36 −36 83 −83 36 36 −83 83 −36 −36 83 −83 36 36 −83 83 −36 −36 83 −83 36 }
{ 31 −78 90 −61 4 54 −88 82 −38 −22 73 −90 67 −13 −46 85 −85 46 13 −67 90 −73 22 38 −82 88 −54 −4 61 −90 78 −31 }
{ 25 −70 90 −80 43 9 −57 87 −87 57 −9 −43 80 −90 70 −25 −25 70 −90 80 −43 −9 57 −87 87 −57 9 43 −80 90 −70 25 }
{ 22 −61 85 −90 73 −38 −4 46 −78 90 −82 54 −13 −31 67 −88 88 −67 31 13 −54 82 −90 78 −46 4 38 −73 90 −85 61 −22 }
{ 18 −50 75 −89 89 −75 50 −18 −18 50 −75 89 −89 75 −50 18 18 −50 75 −89 89 −75 50 −18 −18 50 −75 89 −89 75 −50 18 }
{ 13 −38 61 −78 88 −90 85 −73 54 −31 4 22 −46 67 −82 90 −90 82 −67 46 −22 −4 31 −54 73 −85 90 −88 78 −61 38 −13 }
{ 9 −25 43 −57 70 −80 87 −90 90 −87 80 −70 57 −43 25 −9 −9 25 −43 57 −70 80 −87 90 −90 87 −80 70 −57 43 −25 9 }
{ 4 −13 22 −31 38 −46 54 −61 67 −73 78 −82 85 −88 90 −90 90 −90 88 −85 82 −78 73 −67 61 −54 46 −38 31 −22 13 −4 }

APPENDIX II

64-point DCT-2 core

{
{ aa, aa, aa, aa, aa, aa, aa, aa, aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa }
{ bf, bg, bh, bi, bj, bk, bl, bm, bn, bo, bp, bq, br, bs, bt, bu, bv, bw, bx, by, bz, ca,
cb, cc, cd, ce, cf, cg, ch, ci, cj, ck, −ck, −cj, −ci, −ch, −cg, −cf, −ce, −cd, −cc, −cb, −ca, −bz, −by,
−bx, −bw, −bv, −bu, −bt, −bs, −br, −bq, −bp, −bo, −bn, −bm, −bl, −bk, −bj, −bi, −bh, −bg, −bf }
{ ap, aq, ar, as, at, au, av, aw, ax, ay, az, ba, bb, bc, bd, be, −be, −bd, −bc, −bb, −ba, −az,
−ay, −ax, −aw, −av, −au, −at, −as, −ar, −aq, −ap, −ap, −aq, −ar, −as, −at, −au, −av, −aw, −ax, −ay, −az, −ba,
−bb, −bc, −bd, −be, be, bd, bc, bb, ba, az, ay, ax, aw, av, au, at, as, ar, aq, ap }
{ bg, bj, bm, bp, bs, bv, by, cb, ce, ch, ck, −ci, −cf, −cc, −bz, −bw, −bt, −bq, −bn, −bk, −bh, −bf,
−bi, −bl, −bo, −br, −bu, −bx, −ca, −cd, −cg, −cj, cj, cg, cd, ca, bx, bu, br, bo, bl, bi, bf, bh, bk,
bn, bq, bt, bw, bz, cc, cf, ci, −ck, −ch, −ce, −cb, −by, −bv, −bs, −bp, −bm, −bj, −bg }
{ ah, ai, aj, ak, al, am, an, ao, −ao, −an, −am, −al, −ak, −aj, −ai, −ah, −ah, −ai, −aj, −ak, −al, −am,
−an, −ao, ao, an, am, al, ak, aj, ai, ah, ah, ai, aj, ak, al, am, an, ao, −ao, −an, −am, −al, −ak,
−aj, −ai, −ah, −ah, −ai, −aj, −ak, −al, −am, −an, −ao, ao, an, am, al, ak, aj, ai, ah }
{ bh, bm, br, bw, cb, cg, −ck, −cf, −ca, −bv, −bq, −bl, −bg, −bi, −bn, −bs, −bx, −cc, −ch, cj, ce, bz,
bu, bp, bk, bf, bj, bo, bt, by, cd, ci, −ci, −cd, −by, −bt, −bo, −bj, −bf, −bk, −bp, −bu, −bz, −ce, −cj,
ch, cc, bx, bs, bn, bi, bg, bl, bq, bv, ca, cf, ck, −cg, −cb, −bw, −br, −bm, −bh }
{ aq, at, aw, az, bc, −be, −bb, −ay, −av, −as, −ap, −ar, −au, −ax, −ba, −bd, bd, ba, ax, au, ar, ap,
as, av, ay, bb, be, −bc, −az, −aw, −at, −aq, −aq, −at, −aw, −az, −bc, be, bb, ay, av, as, ap, ar, au,
ax, ba, bd, −bd, −ba, −ax, −au, −ar, −ap, −as, −av, −ay, −bb, −be, bc, az, aw, at, aq }
{ bi, bp, bw, cd, ck, −ce, −bx, −bq, −bj, −bh, −bo, −bv, −cc, −cj, cf, by, br, bk, bg, bn, bu, cb,
ci, −cg, −bz, −bs, −bl, −bf, −bm, −bt, −ca, −ch, ch, ca, bt, bm, bf, bl, bs, bz, cg, −ci, −cb, −bu, −bn,
−bg, −bk, −br, −by, −cf, cj, cc, bv, bo, bh, bj, bq, bx, ce, −ck, −cd, −bw, −bp, −bi }
{ ad, ae, af, ag, −ag, −af, −ae, −ad, −ad, −ae, −af, −ag, ag, af, ae, ad, ad, ae, af, ag, −ag, −af,
−ae, −ad, −ad, −ae, −af, −ag, ag, af, ae, ad, ad, ae, af, ag, −ag, −af, −ae, −ad, −ad, −ae, −af, −ag, ag,
af, ae, ad, ad, ae, af, ag, −ag, −af, −ae, −ad, −ad, −ae, −af, −ag, ag, af, ae, ad }
{ bj, bs, cb, ck, −cc, −bt, −bk, −bi, −br, −ca, −cj, cd, bu, bl, bh, bq, bz, ci, −ce, −bv, −bm, −bg,
−bp, −by, −ch, cf, bw, bn, bf, bo, bx, cg, −cg, −bx, −bo, −bf, −bn, −bw, −cf, ch, by, bp, bg, bm, bv, ce,
−ci, −bz, −bq, −bh, −bl, −bu, −cd, cj, ca, br, bi, bk, bt, cc, −ck, −cb, −bs, −bj }
{ ar, aw, bb, −bd, −ay, −at, −ap, −au, −az, −be, ba, av, aq, as, ax, bc, −bc, −ax, −as, −aq, −av, −ba,
be, az, au, ap, at, ay, bd, −bb, −aw, −ar, −ar, −aw, −bb, bd, ay, at, ap, au, az, be, −ba, −av, −aq,
−as, −ax, −be, bc, ax, as, aq, av, ba, −be, −az, −au, −ap, −at, −ay, −bd, bb, aw, ar }
{ bk, bv, cg, −ce, −bt, −bi, −bm, −bx, −ci, cc, br, bg, bo, bz, ck, −ca, −bp, −bf, −bq, −cb, cj, by,
bn, bh, bs, cd, −ch, −bw, −bl, −bj, −bu, −cf, cf, bu, bj, bl, bw, ch, −cd, −bs, −bh, −bn, −by, −cj, cb, bq,
−cf, −bm, −bi, −bt, −ce, cg, bv, bk }
{ ai, al, ao, −am, −aj, −ah, −ak, −an, an, ak, ah, aj, am, −ao, −al, −ai, −ai, −al, −ao, am, aj, ah,
ak, an, −an, −ak, −ah, −aj, −am, ao, al, ai, ai, al, ao, −am, −aj, −ah, −ak, −an, an, ak, ah, aj, am,
−ao, −al, −ai, −ai, −al, −ao, am, aj, ah, ak, an, −an, −ak, −ah, −aj, −am, ao, al, ai }

APPENDIX II-continued 64-point DCT-2 core

{ bl, by, −ck, −bx, −bk, −bm, −bz, cj, bw, bj, bn, ca, −ci, −bv, −bi, −bo, −cb, ch, bu, bh, bp, cc, −cg, −bt, −bg, −bq, −cd, cf, bs, bf, br, ce, −ce, −br, −bf, −bs, −cf, cd, bq, bg, bt, cg, −cc, −bp, −bh, −bu, −ch, cb, bo, bi, bv, ci, −ca, −bn, −bj, −bw, −cj, bz, bm, bk, bx, ck, −by, −bl }
{ as, az, −bd, −aw, −ap, −av, −bc, ba, at, ar, ay, −be, −ax, −aq, −au, −bb, bb, au, aq, ax, be, −ay, −ar, −at, −ba, bc, av, ap, aw, bd, −az, −as, −as, −az, bd, aw, ap, av, bc, −ba, −at, −ar, −ay, be, ax, aq, au, bb, −bb, −au, −aq, −ax, −be, ay, ar, at, ba, −bc, −av, −ap, −aw, −bd, az, as }
{ bm, cb, −cf, −bq, −bi, −bx, cj, bu, bf, bt, ci, −by, −bj, −bp, −ce, cc, bn, bl, ca, −cg, −br, −bh, −bw, ck, bv, bg, bs, ch, −bz, −bk, −bo, −cd, cd, bo, bk, bz, −ch, −bs, −bg, −bv, −ck, bw, bh, br, cg, −ca, −bl, −bn, −cc, ce, bp, bj, by, −ci, −bt, −bf, −bu, −cj, bx, bi, bq, cf, −cb, −bm }
{ ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab }
{ bn, ce, −ca, −bj, −br, −ci, bw, bf, bv, −cj, −bs, −bi, −bz, cf, bo, bm, cd, −cb, −bk, −bq, −ch, bx, bg, bu, −ck, −bt, −bh, −by, cg, bp, bl, cc, −cc, −bl, −bp, −cg, by, bh, bt, ck, −bu, −bg, −bx, ch, bq, bk, cb, −cd, −bm, −bo, −cf, bz, bi, bs, cj, −bv, −bf, −bw, ci, br, bj, ca, −ce, −bn }
{ at, bc, −ay, −ap, −ax, bd, au, as, bb, −az, −aq, −aw, be, av, ar, ba, −ba, −ar, −av, −be, aw, aq, az, −bb, −as, −au, −bd, ax, ap, ay, −bc, −at, −at, −bc, ay, ap, ax, −bd, −au, −as, −bb, az, aq, aw, −be, −av, −ar, −ba, ba, ar, av, be, −aw, −aq, −az, bb, as, au, bd, −ax, −ap, −ay, bc, at }
{ bo, ch, −bv, −bh, −ca, cc, bj, bt, −cj, −bq, −bm, −cf, bx, bf, by, −ce, −bl, −br, −ck, bs, bk, cd, −bz, −bg, −bw, cg, bn, bp, ci, −bu, −bi, −cb, cb, bi, bu, −ci, −bp, −bn, −cg, bw, bg, bz, −cd, −bk, −bs, ck, br, bl, ce, −by, −bf, −bx, cf, bm, bq, cj, −bt, −bj, −cc, ca, bh, bv, −ch, −bo }
{ aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj, aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj }
{ bp, ck, −bq, −bo, −cj, br, bn, ci, −bs, −bm, −ch, bt, bl, cg, −bu, −bk, −cf, bv, bj, ce, −bw, −bi, −cd, bx, bh, cc, −by, −bg, −cb, bz, bf, ca, −ca, −bf, −bz, cb, bg, by, −cc, −bh, −bx, cd, bi, bw, −ce, −bj, −bv, cf, bk, bu, −cg, −bl, −bt, ch, bm, bs, −ci, −bn, −br, cj, bo, bq, −ck, −bp }
{ au, −be, −at, −av, bd, as, aw, −bc, −ar, −ax, bb, aq, ay, −ba, −ap, −az, az, ap, ba, −ay, −aq, −bb, ax, ar, bc, −aw, −as, −bd, av, at, be, −au, −au, be, at, av, −bd, −as, −aw, bc, ar, ax, −bb, −aq, −ay, ba, ap, az, −az, −ap, −ba, ay, aq, bb, −ax, −ar, −bc, aw, as, bd, −av, −at, −be, au }
{ bq, −ci, −bl, −bv, cd, bg, ca, −by, −bi, −cf, bt, bn, ck, −bo, −bs, cg, bj, bx, −cb, −bf, −cc, bw, bk, ch, −br, −bp, cj, bm, bu, −ce, −bh, −bz, bz, bh, ce, −bu, −bm, −cj, bp, br, −ch, −bk, −bw, cc, bf, cb, −bx, −bj, −cg, bs, bo, −ck, −bn, −bt, cf, bi, by, −ca, −bg, −cd, bv, bl, ci, −bq }
{ ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae }
{ br, −cf, −bg, −cc, bu, bo, −ci, −bj, −bz, bx, bl, ck, −bm, −bw, ca, bi, ch, −bp, −bt, cd, bf, ce, −bs, −bq, cg, bh, cb, −bv, −bn, cj, bk, by, −by, −bk, −cj, bn, bv, −cb, −bh, −cg, bq, bs, −ce, −bf, −cd, bt, bp, −ch, −bi, −ca, bw, bm, −ck, −bl, −bx, bz, bj, ci, −bo, −bu, cc, bg, cf, −br }
{ av, −bb, −ap, −bc, au, aw, −ba, −aq, −bd, at, ax, −az, −ar, −be, ar, az, −ax, −at, bd, aq, ba, −aw, −au, bc, ap, bb, −av, −av, bb, ap, bc, −au, −aw, ba, aq, bd, −at, −ax, az, ar, be, −ar, −az, ax, at, −bd, −aq, −ba, aw, au, −bc, −ap, −bb, av }
{ bs, −cc, −bi, −cj, bl, bz, −bv, −bp, cf, bf, cg, −bo, −bw, by, bm, −ci, −bh, −cd, br, bt, −cb, −bj, −ck, bk, ca, −bu, −bq, ce, bg, ch, −bn, −bx, bx, bn, −ch, −bg, −ce, bq, bu, −ca, −bk, ck, bj, cb, −bt, −br, cd, bh, ci, −bm, −by, bw, bo, −cg, −bf, −cf, bp, bv, −bz, −bl, cj, bi, cc, −bs }
{ ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak, ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak }
{ bt, −bz, −bn, cf, bh, ck, −bi, −ce, bo, by, −bu, −bs, ca, bm, −cg, −bg, −cj, bj, cd, −bp, −bx, bv, br, −cb, −bl, ch, bf, ci, −bk, −cc, bq, bw, −bw, −bq, cc, bk, −ci, −bf, −ch, bl, cb, −br, −bv, bx, bp, −cd, −bj, cj, bg, cg, −bm, −ca, bs, bu, −by, −bo, ce, bi, −ck, −bh, −cf, bn, bz, −bt }
{ aw, −ay, −au, ba, as, −be, −aq, bb, ap, bd, −ar, −bb, at, az, −av, −ax, ax, av, −az, −at, bb, ar, −bd, −ap, −be, aq, bc, −as, −ba, au, ay, −aw, −aw, ay, au, −ba, −as, be, aq, −bb, −ap, −bd, ar, bb, −at, −az, av, ax, −ax, −av, az, at, −bb, −ar, bd, ap, be, −aq, −bc, as, ba, −au, −ay, aw }
{ bu, −bw, −bs, by, bq, −ca, −bo, cc, bm, −ce, −bk, cg, bi, −ci, −bg, ck, bf, cj, −bh, −ch, bj, cf, −bl, −cd, bn, cb, −bp, −bz, br, bx, −bt, −bv, bv, bt, −bx, −br, bz, bp, −cb, −bn, cd, bl, −cf, −bj, ch, bh, −cj, −bf, −ck, bg, ci, −bi, −cg, bk, ce, −bm, −cc, bo, ca, −bq, −by, bs, bw, −bu }
{ aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa }
{ bv, −bt, −bx, br, bz, −bp, −cb, bn, cd, −bl, −cf, bj, ch, −bh, −cj, bf, −ck, −bg, ci, bi, −cg, −bk, ce, bm, −cc, −bo, ca, bq, −by, −bs, bw, bu, −bu, −bw, bs, by, −bq, −ca, bo, cc, −bm, −ce, bk, cg, −bi, −ci, bh, cj, −bf, ck, bg, −ch, −bj, cf, bl, −cd, −bn, cb, bp, −bz, −br, bx, bt, −bv }
{ ax, −av, −az, at, bb, −ar, −bd, ap, −be, −aq, bc, as, −ba, −au, ay, aw, −aw, −ay, au, ba, −as, −bc, aq, be, −ap, bd, ar, −bb, −at, az, av, −ax, −ax, av, az, −at, −bb, ar, bd, −ap, be, aq, −bc, −as, ba, au, −ay, −aw, aw, ay, −au, −ba, as, bc, −aq, −be, ap, −bd, −ar, bb, at, −az, −av, ax }
{ bw, −bq, −cc, bk, ci, −bf, ch, bl, −cb, −br, bv, bx, −bp, −cd, bj, cj, −bg, cg, bm, −ca, −bs, bu, by, −bo, −ce, bi, ck, −bh, cf, bn, −bz, −bt, bt, bz, −bn, −cf, bh, −ck, −bi, ce, bo, −by, −bu, bs, ca, −bm, −cg, bg, −cj, −bj, cd, bp, −bx, −bv, br, cb, −bl, −ch, bf, −ci, −bk, cc, bq, −bw }
{ al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al, al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al }
{ bx, −bn, −ch, bg, −ce, −bq, bu, ca, −bk, −ck, bj, −cb, bm, bn, ci, bm, −bq, −bw, bo, cg, −bf, cf, bp, −bv, −bz, bl, cj, −bi, cc, bs, −bs, −cc, bi, −cj, −bl, bz, bv, −bp, −cf, bf, −cg, −bo, bw, by, −bm, −ci, bh, −cd, −br, bt, cb, −bj, ck, bk, −ca, −bu, bq, −ce, −bg, ch, bn, −bx }
{ ay, −as, −be, ar, −az, −ax, at, bd, −aq, ba, aw, −au, −bc, ap, −bb, −av, av, bb, −ap, bc, au, −aw, −ba, aq, −bd, −at, ax, az, −ar, be, as, −ay, −ay, as, be, −ar, az, ax, −at, −bd, aq, −ba, −aw, au, bc, −ap, bb, av, −av, −bb, ap, −bc, −au, aw, ba, −aq, bd, at, −ax, −az, ar, −be, −as, ay }

APPENDIX II-continued 64-point DCT-2 core

{ by, −bk, cj, bn, −bv, −cb, bh, −cg, −bq, bs, ce, −bf, cd, bt, −bp, −ch, bi, −ca, −bw, bm, ck, −bl, bx, bz, −bj, ci, bo, −bu, −cc, bg, −cf, −br, br, cf, −bg, cc, bu, −bo, −ci, bj, −bz, −bx, bl, −ck, −bm, bw, ca, −bi, ch, bp, −bt, −cd, bf, −ce, −bs, bq, cg, −bh, cb, bv, −bn, −cj, bk, −by }
{ af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af }
{ bz, −bh, ce, bu, −bm, cj, bp, −br, −ch, bk, −bw, −cc, bf, −cb, −bx, bj, −cg, −bs, bo, ck, −bn, bt, cf, −bi, by, ca, −bg, cd, bv, −bl, ci, bq, −bq, −ci, bl, −bv, −cd, bg, −ca, −by, bi, −cf, −bt, bn, −ck, −bo, bs, cg, −bj, bx, cb, −bf, cc, bw, −bk, ch, br, −bp, −cj, bm, −bu, −ce, bh, −bz }
{ az, −ap, ba, ay, −aq, bb, ax, −ar, bc, aw, −as, bd, av, −at, be, au, −au, −be, at, −av, −bd, as, −aw, −bc, ar, −ax, −bb, aq, −ay, −ba, ap, −az, −az, ap, −ba, −ay, aq, −bb, −ax, ar, −be, −aw, as, −bd, −av, at, −be, −au, au, be, −at, av, bd, −as, aw, bc, −ar, ax, bb, −aq, ay, ba, −ap, az }
{ ca, −bf, bz, cb, −bg, by, cc, −bh, bx, cd, −bi, bw, ce, −bj, bv, cf, −bk, bu, cg, −bl, bt, ch, −bm, bs, ci, −bn, br, cj, −bo, bq, ck, −bp, bp, −ck, −bq, bo, −cj, −br, bn, −ci, −bs, bm, −ch, −bt, bl, −cg, −bu, bk, −cf, −bv, bj, −ce, −bw, bi, −cd, −bx, bh, −cc, −by, cb, −bz, bf, −ca }
{ am, −ah, al, an, −ai, ak, ao, −aj, aj, −ao, −ak, ai, −an, −al, ah, −am, −am, ah, −al, −an, ai, −ak, −ao, aj, −aj, ao, ak, −ai, an, al, −ah, am, am, −ah, al, an, −ai, ak, ao, −aj, aj, −ao, −ak, ai, −an, −al, ah, −am, −am, ah, −al, −an, ai, −ak, −ao, aj, −aj, ao, ak, −ai, an, al, −ah, am }
{ cb, −bi, bu, ci, −bp, bn, −cg, −bw, bg, −bz, −cd, bk, −bs, −ck, br, −bl, ce, by, −bf, bx, cf, −bm, bq, −cj, −bt, bj, −cc, −ca, bh, −bv, −ch, bo, −bo, ch, bv, −bh, ca, cc, −bj, bt, cj, −bq, bm, −cf, −bx, bf, −by, −ce, bl, −br, ck, bs, −bk, cd, bz, −bg, bw, cg, −bn, bp, −ci, −bu, bi, −cb }
{ ba, −ar, av, −be, −aw, aq, −az, −bb, as, −au, bd, ax, −ap, ay, bc, −at, at, −bc, −ay, ap, −ax, −bd, au, −as, bb, az, −aq, aw, be, −av, ar, −ba, −ba, ar, −av, be, aw, −aq, az, bb, −as, au, −bd, −ax, ap, −ay, −bc, at, −at, bc, ay, −ap, ax, bd, −au, as, −bb, −az, aq, −aw, −be, av, −ar, ba }
{ cc, −bl, bp, −cg, −by, bh, −bt, ck, bu, −bg, bx, ch, −bq, bk, −cb, −cd, bm, −bo, cf, bz, −bi, bs, −cj, −bv, bf, −bw, −ci, br, −bj, ca, ce, −bn, bn, −ce, −ca, bj, −br, ci, bw, −bf, bv, cj, −bs, bi, −bz, −cf, bo, −bm, cd, cb, −bk, bq, −ch, −bx, bg, −bu, −ck, bt, −bh, by, cg, −bp, bl, −cc }
{ ae, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac }
{ cd, −bo, bk, −bz, −ch, bs, −bg, bv, −ck, −bw, bh, −br, cg, ca, −bl, bn, −cc, −ce, bp, −bj, by, ci, −bt, bf, −bu, cj, bx, −bi, bq, −cf, −cb, bm, −bm, cb, cf, −bq, bi, −bx, −cj, bu, −bf, bt, −ci, −by, bj, −bp, ce, cc, −bn, bl, −ca, −cg, br, −bh, bw, ck, −bv, bg, −bs, ch, bz, −bk, bo, −cd }
{ bb, −au, aq, −ax, be, ay, −ar, at, −ba, −bc, av, −ap, aw, −bd, −az, as, −as, az, bd, −aw, ap, −av, bc, ba, −at, ar, −ay, −be, ax, −aq, au, −bb, −bb, au, −aq, ax, −be, −ay, ar, −at, ba, bc, −av, ap, −aw, bd, az, −as, as, −az, −bd, aw, −ap, av, −be, −ba, at, −ar, ay, be, −ax, aq, −au, bb }
{ ce, −br, bf, −bs, cf, cd, −bq, bg, −bt, cg, cc, −bp, bh, −bu, ch, cb, −bo, bi, −bv, ci, ca, −bn, bj, −bw, cj, bz, −bm, bk, −bx, ck, by, −bl, bl, −by, −ck, bx, −bk, bm, −bz, −cj, bw, −bj, bn, −ca, −ci, bv, −bi, bo, −cb, −ch, bu, −bh, bp, −cc, −cg, bt, −bg, bq, −cd, −cf, bs, −bf, br, −ce }
{ an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an, an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an }
{ cf, −bu, bj, −bl, bw, −ch, −cd, bs, −bh, bn, −by, cj, cb, −bq, bf, −bp, ca, ck, −bz, bo, −bg, br, −cc, −ci, bx, −bm, bi, −bt, ce, cg, −bv, bk, −bk, bv, −cg, −ce, bt, −bi, bm, −bx, ci, cc, −br, bg, −bo, bz, −ck, −ca, bp, −bf, bq, −cb, −cj, by, −bn, bh, −bs, cd, ch, −bw, bl, −bj, bu, −cf }
{ bc, −ax, as, −aq, av, −ba, −be, az, −au, ap, −at, ay, −bd, −bb, aw, −ar, ar, −aw, bb, bd, −ay, at, −ap, au, −az, be, ba, −av, aq, −as, ax, −bc, −bc, ax, −as, aq, −av, ba, be, −az, au, −ap, at, −ay, bd, bb, −aw, ar, −ar, aw, −bb, −bd, ay, −at, ap, −au, az, −be, −ba, av, −aq, as, −ax, bc }
{ cg, −bx, bo, −bf, bn, −bw, cf, ch, −by, bp, −bg, bm, −bv, ce, ci, −bz, bq, −bh, bl, −bu, cd, cj, −ca, br, −bi, bk, −bt, cc, ck, −cb, bs, −bj, bj, −bs, cb, −ck, −cc, bt, −bk, bi, −br, ca, −cj, −cd, bu, −bl, bh, −bq, bz, −ci, −ce, bv, −bm, bg, −bp, by, −ch, −cf, bw, −bn, bf, −bo, bx, −cg }
{ ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag }
{ ch, −ca, bt, −bm, bf, −bl, bs, −bz, cg, ci, −cb, bu, −bn, bg, −bk, br, −by, cf, cj, −cc, bv, −bo, bh, −bj, bq, −bx, ce, ck, −cd, bw, −bp, bi, −bi, bp, −bw, cd, −ck, −ce, bx, −bq, bj, −bh, bo, −bv, cc, −cj, −cf, by, −br, bk, −bg, bn, −bu, cb, −ci, −cg, bz, −bs, bl, −bf, bm, −bt, ca, −ch }
{ bd, −ba, ax, −au, ar, −ap, as, −av, ay, −bb, be, bc, −az, aw, −at, aq, −aq, at, −aw, az, −bc, −be, bb, −ay, av, −as, ap, −ar, au, −ax, ba, −bd, −bd, ba, −ax, au, −ar, ap, −as, av, −ay, bb, −be, −bc, az, −aw, at, −aq, aq, −at, aw, −az, bc, be, −bb, ay, −av, as, −ap, ar, −au, ax, −ba, bd }
{ ci, −cd, by, −bt, bo, −bj, bf, −bk, bp, −bu, bz, −ce, cj, ch, −cc, bx, −bs, bn, −bi, bg, −bl, bq, −bv, ca, −cf, ck, cg, −cb, bw, −br, bm, −bh, bh, −bm, br, −bw, cb, −cg, −ck, cf, −ca, bv, −bq, bl, −bg, bi, −bn, bs, −bx, cc, −ch, −cj, ce, −bz, bu, −bp, bk, −bf, bj, −bo, bt, −by, cd, −ci }
{ ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao, ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao }
{ cj, −cg, cd, −ca, bx, −bu, br, −bo, bl, −bi, bf, −bh, bk, −bn, bq, −bt, bw, −bz, cc, −cf, ci, ck, −ch, ce, −cb, by, −bv, bs, −bp, bm, −bj, bg, −bg, bj, −bm, bp, −bs, bv, −by, cb, −ce, ch, −ck, −ci, cf, −cc, bz, −bw, bt, −bq, bn, −bk, bh, −bf, bi, −bl, bo, −br, bu, −bx, ca, −cd, cg, −cj }
{ be, −bd, bc, −bb, ba, −az, ay, −ax, aw, −av, au, −at, as, −ar, aq, −ap, ap, −aq, ar, −as, at, −au, av, −aw, ax, −ay, az, −ba, bb, −bc, bd, −be, −be, bd, −bc, bb, −ba, az, −ay, ax, −aw, av, −au, at, −as, ar, −aq, ap, −ap, aq, −ar, as, −at, au, −av, aw, −ax, ay, −az, ba, −bb, bc, −bd, be }
{ ck, −cj, ci, −ch, cg, −cf, ce, −cd, cc, −cb, ca, −bz, by, −bx, bw, −bv, bu, −bt, bs, −br, bq, −bp, bo, −bn, bm, −bl, bk, −bj, bi, −bh, bg, −bf, bf, −bg, bh, −bi, bj, −bk, bl, −bm, bn, −bo, bp, −bq, br, −bs, bt, −bu, bv, −bw, bx, −by, bz, −ca, cb, −cc, cd, −ce, cf, −cg, ch, −ci, cj, −ck }
}

APPENDIX II-continued 64-point DCT-2 core where
{ aa, ab, ac, ad, ae, af, ag, ah, ai, aj, ak, al, am, an, ao, ap, aq, ar, as, at, au, av, aw, ay, az, ba, bb, bc, bd, be, bf, bg, bh, bi, bj, bk, bl, bm, bn, bo, bp, bq, br, bs, bt, bu, bv, bw, bx, by, bz, ca, cb, cd, ce, cf, cg, ch, ci, cj, ck } =
{64, 83, 36, 89, 75, 50, 18, 90, 87, 80, 70, 57, 43, 25, 9, 90, 90, 88, 85, 85, 78, 73, 67, 61, 54, 46, 38, 31, 22, 13, 4, 91, 90, 90, 90, 88, 87, 86, 84, 83, 81, 79, 77, 73, 71, 69, 65, 62, 59, 56, 52, 48, 44, 41, 37, 33, 28, 24, 20, 15, 11, 7, 2 }

APPENDIX III

4-point DST-7

{ a, b, c, d }
{ c, c, 0, −c }
{ d, −a, −c, b }
{ b, −d, c, −a }
where
{ a, b, c, d } = { 29, 55, 74, 84 }

8-point DST-7:

{ a, b, c, d, e, f, g, h, }
{ c, f, h, e, b, −a, −d, −g, }
{ e, g, b, −c, −h, −d, a, f, }
{ g, c, −d, −f a, h, b, −e,}
{ h, −a, −g, b, f, −c, −e, d,}
{ f, −e, −a, g, −d, −b, h, −c,}
{ d, −h, e, −a, −c, g, −f, b,}
{ b, −d, f, −h, g, −e, c, −a,}
where
{ a, b, c, d, e, f, g, h } = {17, 32, 46, 60, 71, 78, 85, 86 }

16-point DST-7

{ a, b, c, d, e, f, g, h, i, j, k, l, m, n, o, p, }
{ c, f, i, l, o, o, l, i, f, c, 0, −c, −f, −i, −l, −o, }
{ e, j, o, m, h, c, −b, −g, −l, −p, −k, −f −a, d, i, n, }
{ g, n, l, e, −b, −i, −p, −j, −c, d, k, o, h, a, −f, −m, }
{ i, o, f, −c, −l, −l, −c, f, o, i, 0, −i, −o, −f, c, l, }
{ k, k, 0, −k, −k, 0, k, k, 0, −k, −k, 0, k, k, 0, −k, }
{ m, g, −f, −n, −a, l, h, −e, −o, −b, k, i, −d, −p, −c, j, }
{ o, c, −l, −f, i, i, −f, −l, c, o, 0, −o, −c, l, f, −i, }
{ p, −a, −o, b, n, −c, −m, d, l, −e, −k, f, j, −g, −i, h, }
{ n, −e, −i, j, d, −o, a, m, −f, −h, k, c, −p, b, l, −g, }
{ i, −i, −c, o, −f, −f, o, −c, −i, l, 0, −l, i, c, −o, f, }
{ j, −m, c, g, −p, f, d, −n, i, a, −k, l, −b, −h, o, −e, }
{ h, −p, i, −a, −g, o, −j, b, f, −n, k, −c, −e, m, −l, d,}
{ f, −l, o, −i, c, c, −i, o, −l, f, 0, −f, l, −o, i, −c, }
{ d, −h, l, −p, m, −i, e, −a, −c, g, −k, o, −n, j, −f, b, }
{ b, −d, f, −h, j, −l, n, −p, o, −m, k, −i, g, −e, c, −a, }
where
{ a, b, c, d, e, f, g, h, i, j, k, l, m, n, o, p } = {9, 17, 25, 33, 41, 49, 56, 62, 66, 72, 77, 81, 83, 87, 89, 90 }

32-point DST-7

{ a, b, c, d, e, f, g, h, i, j, k, l, m, n, o, p, q, r, s, t, u, v, w, x, y, z, A, B, C, D, E, F, }
{ c, f, i, l, o, r, u, x, A, D, F, C, z, w, t, q, n, k, h, e, b, −a, −d, −g, −j, −m, −p, −s, −v, −y, −B, −E, }
{ e, j, o, t, y, D, D, y, t, o, j, e, 0, −e, −j, −o, −t, −y, −D, −D, −y, −t, −o, −j, −e, 0, e, j, o, t, y, D, }
{ g, n, u, B, D, w, p, i, b, −e, −l, −s, −z, −F, −y, −r, −k, −d, c, j, q, x, E, A, t, m, f, −a, −h, −o, −v, −C, }
{ i, r, A, C, t, k, b, −g, −p, −y, −E, −v, −m, −d, e, n, w, F, x, o, f, −c, −l, −u, −D, −z, −q, −h, a, j, s, B, }
{ k, v, F, u, j, −a, −l, −w, −E, −t, −i, b, m, x, D, s, h, −c, −n, −y, −C, −r, −g, d, o, z, B, q, f, −e, −p, −A, }
{ m, z, z, m, 0, −m, −z, −z, −m, 0, m, z, z, m, 0, −m, −z, −z, −m, 0, m, z, z, m, 0, −m, −z, −z, −m, 0, m, z, }
{ o, D, t, e, −j, −y, −y, −j, e, t, D, o, 0, −o, −D, −t, −e, j, y, y, j, −e, −t, −D, −o, 0, o, D, t, e, −j, −y, }
{ q, E, n, −c, −t, −B, −k, f, w, y, h, −i, −z, −v, −e, l, C, s, b, −o, −F, −p, a, r, D, m, −d, −u, −A, −j, g, x, }
{ s, A, h, −k, −D, −p, c, v, x, e, −n, −F, −m, f, y, u, b, −q, −C, −j, i, B, r, −a, −t, −z, −g, l, E, o, −d, −w, }
{ u, w, b, −s, −y, −d, q, A, f, −o, −C, −h, m, E, j, −k, −F, −l, i, D, n, −g, −B, −p, e, z, r, −c, −x, −t, a, v, }
{ w, s, −d, −A, −o, h, E, k, −l, −D, −g, p, z, c, −t, −v, a, x, r, −e, −B, −n, i, F, j, −m, −C, −f, q, y, b, −u, }
{ y, o, −j, −D, −e, t, t, −e, −D, −j, o, y, 0, −y, −o, j, D, e, −t, −t, e, D, j, −o, −y, 0, y, o, −j, −D, −e, t, }
{ A, k, −p, −v, e, F, f, −u, −q, j, B, a, −z, −l, o, w, −d, −E, −g, t, r, −i, −C, −b, y, m, −n, −x, c, D, h, −s, }
{ C, g, −v, −n, o, u, −h, −B, a, D, f, −w, −m, p, t, −i, −A, b, E, e, −x, −l, q, s, −j, −z, c, F, d, −y, −k, r, }
{ E, c, −B, −f, y, i, −v, −l, s, o, −p, −r, m, u, −j, −x, g, A, −d, −D, a, F, b, −C, −e, z, h, −w, −k, t, n, −q, }
{ F, −a, −E, b, D, −c, −C, d, B, −e, −A, f, z, −g, −y, h, x, −i, −w, j, v, −k, −u, l, t, −m, −s, n, r, −o, −q, p, }
{ D, −e, −y, j, t, −o, −o, t, j, −v, −e, D, 0, −D, e, y, −j, −t, o, o, −t, −j, y, e, −D, 0, D, −e, −y, j, t, −o, }
{ B, −i, −s, r, j, −A, −a, C, −h, −t, q, k, −z, −b, D, −g, −u, p, l, −y, −c, E, −f, −v, o, m, −x, −d, F, −e, −w, n, }

{ z, −m, −m, z, 0, −z, m, m, −z, 0, z, −m, −m, z, 0, −z, m, m, −z, 0, z, −m, −m, z, 0, −z, m, m, −z, 0, z, −m, }
{ x, −q, −g, E, −j, −n, A, −c, −u, t, d, −B, m, k, −D, f, r, −w, −a, y, −p, −h, F, −i, −o, z, −b, −v, s, e, −C, l, }
{ v, −u, −a, w, −t, −b, x, −s, −c, y, −r, −d, z, −q, −e, A, −p, −f, B, −o, −g, C, −n, −h, D, −m, −i, E, −l, −j, F, −k, }
{ t, −y, e, o, −D, j, j, −D, o, e, −y, t, 0, −t, y, −e, −o, D, −j, −j, D, −o, −e, y, −t, 0, t, −y, e, o, −D, j, }
{ r, −C, k, g, −y, v, −d, −n, F, −o, −c, u, −z, h, j, −B, s, −a, −q, D, −l, −f, x, −w, e, m, −E, p, b, −t, A, −i, }
{ p, −F, q, −a, −o, E, −r, b, n, −D, s, −c, −m, C, −t, d, l, −B, u, −e, −k, A, −v, f, j, −z, w, −g, −i, y, −x, h, }
{ n, −B, w, −i, −e, s, −F, r, −d, −j, x, −A, m, a, −o, C, −v, h, f, −t, E, −q, c, k, −y, z, −l, −b, p, −D, u, −g, }
{ l, −x, C, −q, e, g, −s, E, −v, j, b, −n, z, −A, o, −c, −i, u, −F, t, −h, −d, p, −B, y, −m, a, k, −w, D, −r, f, }
{ j, −t, D, −y, o, −e, −e, o, −y, D, −t, j, 0, −j, t, −D, y, −o, e, e, −o, y, −D, t, −j, 0, j, −t, D, −y, o, −e, }
{ h, −p, x, −F, y, −q, i, −a, −g, o, −w, E, −z, r, −j, b, f, −n, v, −D, A, −s, k, −c, −e, m, −u, C, −B, t, −l, d, }
{ f, −l, r, −x, D, −C, w, −q, k, −e, −a, g, −m, s, −y, E, −B, v, −p, j, −d, −b, h, −n, t, −z, F, −A, u, −o, i, −c, }
{ d, −h, l, −p, t, −x, B, −F, C, −y, u, −q, m, −i, e, −a, −c, g, −k, o, −s, w, −A, E, −D, z, −v, r, −n, j, −f, b, }
{ b, −d, f, −h, j, −l, n, −p, r, −t, v, −x, z, −B, D, −F, E, −C, A, −v, w, −u, s, −q, o, −m, k, −i, g, −e, c, −a, }
where
{ a, b, c, d, e, f, g, h, i, j, k, l, m, n, o, p, q, r, s, t, u, v, w, x, y, z, A, B, C, D, E, F } = { 4, 9, 13, 17, 21, 26, 30, 34, 38, 42, 45, 50, 53, 56, 60, 63, 66, 68, 72, 74, 77, 78, 80, 82, 84, 85, 86, 88, 88, 89, 90, 90 }

4-point DCT-8

{ a, b, c, d, }
{ b, 0, −b, −b, }
{ c, −b, −d, a, }
{ d, −b, a, −c, }
where
{ a, b, c, d } = { 84, 74, 55, 29 }

8-point DCT-8:

{ a, b, c, d, e, f, g, h, }
{ b, e, h, −g, −d, −a, −c, −f, }
{ c, h, −e, −a, −f, g, b, d, }
{ d, −g, −a, −h, c, e, −f, −b, }
{ e, −d, −f, c, g, −b, −h, a, }
{ f, −a, g, e, −b, h, d, −c, }
{ g, −c, b, −f, −h, d, −a, e, }
{ h, −f, d, −b, a, −c, e, −g, }
where
{ a, b, c, d, e, f, g, h } = { 86, 85, 78, 71, 60, 46, 32, 17 }

16-point DCT-8

{ a, b, c, d, e, f, g, h, i, j, k, l, m, n, o, p, }
{ b, e, h, k, n, 0, −n, −k, −h, −e, −b, −b, −e, −h, −k, −n, }
{ c, h, m, −p, −k, −f, −a, −e, −j, −o, n, i, d, b, g, l, }
{ d, k, −p, −i, −b, −f, −m, n, g, a, h, o, −l, −e, −c, −j, }
{ e, n, −k, −b, −h, 0, h, b, k, −n, −e, −e, −n, k, b, h, }
{ f, 0, −f, −f, 0, f, f, 0, −f, −f, 0, f, f, 0, −f, −f, }
{ g, −n, −a, −m, h, f, −o, −b, −l, i, e, −p, −c, −k, j, d, }
{ h, −k, −e, n, b, 0, −b, −n, e, k, −h, −h, k, e, −n, −b, }
{ i, −h, −j, g, k, −f, −l, e, m, −d, −n, c, o, −b, −p, a, }
{ j, −e, −o, a, −n, −f, i, k, −d, −p, b, −m, −g, h, l, −c, }
{ k, −b, n, h, −e, 0, e, −h, −n, b, −k, −k, b, −n, −h, e, }
{ l, −b, i, o, −e, f, −p, −h, c, −m, −k, a, −j, −n, d, −g, }
{ m, −e, d, −l, −n, f, −c, k, o, −g, b, −j, −p, h, −a, i, }
{ n, −h, b, −e, k, 0, −k, e, −b, h, −n, −n, h, −b, e, −k, }
{ o, −k, g, −c, b, −f, j, −e, −p, l, −h, d, −a, e, −i, m, }
{ p, −n, l, −j, h, −f, d, −b, a, −c, e, −g, i, −k, m, −o, }
where
{ a, b, c, d, e, f, g, h, i, j, k, l, m, n, o, p } = { 90, 89, 87, 83, 81, 77, 72, 66, 62, 56, 49, 41, 33, 25, 17, 9 }

32-point DCT-8

{ a, b, c, d, e, f, g, h, i, j, k, l, m, n, o, p, q, r, s, t, u, v, w, x, y, z, A, B, C, D, E, F, }
{ b, e, h, k, n, q, t, w, z, C, F, −E, −B, −y, −v, −s, −p, −m, −j, −g, −d, −a, −c, −f, −i, −l, −o, −r, −u, −x, −A, −D, }
{ c, h, m, r, w, B, 0, −B, −w, −r, −m, −h, −c, −c, −h, −m, −r, −w, −B, 0, B, w, r, m, h, c, c, h, m, r, w, B, }
{ d, k, r, y, F, −A, −t, −m, −f, −b, −i, −p, −w, −D, C, v, o, h, a, g, n, u, B, −E, −x, −q, −j, −c, −e, −l, −s, −z, }
{ e, n, w, F, −y, −p, −g, −c, −l, −u, −D, A, r, i, a, j, s, B, −C, −t, −k, −b, −h, −q, −z, E, v, m, d, f, o, x, }
{ f, q, B, −A, −p, −e, −g, −r, −C, z, o, d, h, s, D, −y, −n, −c, −i, −t, −E, x, m, b, j, u, F, −w, −l, −a, −k, −v, }
{ g, t, 0, −t, −g, −g, −t, 0, t, g, g, t, 0, −t, −g, −g, −t, 0, t, g, g, t, 0, −t, −g, −g, −t, 0, t, g, g, t, }
{ h, w, −B, −m, −c, −r, 0, r, c, m, B, −w, −h, −h, −w, B, m, c, r, 0, −r, −c, −m, −B, w, h, h, w, −B, −m, −c, −r, }

-continued

{ i, z, −w, −f, −l, −C, t, c, o, F, −q, −a, −r, E, n, d, u, −B, −k, −g, −x, y, h, j, A, −v, −e, −m, −D, s, b, p, }
{ j, C, −r, −b, −u, z, g, m, F, −o, −e, −x, w, d, p, −E, −l, −h, −A, t, a, s, −B, −i, −k, −D, q, c, v, −y, −f, −n, }
{ k, F, −m, −i, −D, o, g, B, −q, −e, −z, s, c, x, −u, −a, −v, w, b, t, −y, −d, −r, A, f, p, −C, −h, −n, E, j, l, }
{ l, −E, −h, −p, A, d, t, −w, −a, −x, s, e, B, −o, −i, −F, k, m, −D, −g, −q, z, c, u, −v, −b, −y, r, f, C, −n, −j, }
{ m, −B, −c, −w, r, h, 0, −h, −r, w, c, B, −m, −tn, B, c, w, −r, −h, 0, h, r, −w, −c, −B, m, m, −B, −c, −w, r, h, }
{ n, −y, −c, −D, i, s, −t, −h, E, d, x, −o, −ni z, b, C, −j, −r, u, g, −F, −e, −w, p, l, −A, −a, −B, k, q, −v, −f, }
{ o, −v, −h, C, a, D, −g, −w, n, p, −u, −i, B, b, E, −f, −x, m, q, −t, −j, A, c, F, −e, −y, l, r, −s, −k, z, d, }
{ p, −s, −m, v, j, −y, −g, B, d, −E, −a, −F, c, C, −f, −z, i, w, −l, −t, o, q, −r, −n, u, k, −x, −h, A, e, −D, −b, }
{ q, −p, −r, o, s, −n, −t, m, u, −l, −v, k, w, −j, −x, i, y, −h, −z, g, A, −f, −B, e, C, −d, −D, c, E, −b, −F, a, }
{ r, −m, −w, h, B, −c, 0, c, −B, −h, w, m, −r, −r, m, w, −h, −B, c, 0, −c, B, h, −w, −m, r, r, −m, −w, h, B, −c, }
{ s, −j, −B, a, −C, −i, t, r, −k, −A, b, −D, −h, u, q, −l, −z, c, −E, −g, v, p, −m, −y, d, −F, −f, w, o, −n, −x, e, }
{ t, −g, 0, g, −t, −t, g, 0, −g, t, t, −g, 0, g, −t, −t, g, 0, −g, t, t, −g, 0, g, −t, −t, g, 0, −g, t, t, −g, }
{ u, −d, B, n, −k, −E, g, −r, −x, a, −y, −q, h, −F, −j, o, A, −c, v, t, −e, C, tn, −l, −D, f, −s, −w, b, −z, −p, i, }
{ v, −a, w, u, −b, x, t, −c, y, s, −d, z, r, −e, A, q, −f, B, p, −g, C, o, −h, D, n, −i, E, m, −j, F, l, −k, }
{ w, −c, r, B, −h, m, 0, −m, h, −B, −r, c, −w, −w, c, −r, −B, h, −m, 0, m, −h, B, r, −c, w, w, −c, r, B, −h, m, }
{ x, −f, m, −E, −q, b, −t, −B, j, −i, A, u, −c, p, F, −n, e, −w, −y, g, −l, D, r, −a, s, C, −k, h, −z, −v, d, −o, }
{ y, −i, h, −x, −z, j, −g, w, A, −k, f, −v, −B, l, −e, u, C, −m, d, −t, −D, n, −c, s, E, −o, b, −r, −F, p, −a, q, }
{ z, −l, c, −q, E, u, −g, h, −v, −D, p, −b, m, −A, −y, k, −d, r, −F, −t, f, −i, w, C, −o, a, −n, B, x, −j, e, −s, }
{ A, −o, c, −j, v, F, −t, h, −e, q, −C, −y, m, −a, l, −x, −D, r, −f, g, −s, E, w, −k, b, −e, z, B, −p, d, −i, u, }
{ B, −r, h, −c, m, −w, 0, w, −m, c, −h, r, −B, −B, r, −h, c, −m, w, 0, −w, m, −c, h, −r, B, B, −r, h, −c, m, −w }
{ C, −u, m, −e, d, −l, t, −B, −D, v, −n, f, −c, k, −s, A, E, −w, o, −g, b, −j, r, −z, −F, x, −p, h, −a, i, −q, y, }
{ D, −x, r, −l, f, −a, g, −m, s, −y, E, C, −w, q, −k, e, −b, h, −n, t, −z, F, B, −v, p, −j, d, −c, i, −o, u, −A, }
{ E, −A, w, −s, o, −k, g, −c, b, −f, j, −n, r, −v, z, −D, −F, B, −x, t, −p, l, −h, d, −a, e, −i, m, −q, u, −y, C, }
{ F, −D, B, −z, x, −v, t, −r, p, −n, l, −j, h, −f, d, −b, a, −c, e, −g, i, −k, m, −o, q, −s, u, −w, y, −A, C, −E, }
where
{ a, b, c, d, e, f, g, h, i, j, k, l, m, n, o, p, q, r, s, t, u, v, w, x, y, z, A, B, C, D, E, F } =
{ 90, 90, 89, 88, 88, 86, 85, 84, 82, 80, 78, 77, 74, 72, 68, 66, 63, 60, 56, 53, 50, 45, 42, 38, 34, 30, 26, 21, 17, 13, 9, 4 }

What is claimed is:

1. A method for video decoding, comprising:
    decoding coding information of a coding unit (CU) from a coded video bitstream, the coding information indicating a size of the CU, the CU including at least one chroma block;
    determining a maximum transform unit (TU) size in the CU from the coded video bitstream;
    determining a CU width threshold and a CU height threshold, the CU width threshold and the CU height threshold being both less than the maximum TU size; and
    determining whether a secondary transform is allowed for the CU including the at least one chroma block, wherein
    when the secondary transform is allowed and a secondary transform index for the secondary transform is signaled, the size of the CU is less than or equal to the CU width threshold or the CU height threshold.

2. The method of claim 1, further comprising:
    when the size of the CU is less than or equal to the CU width threshold or the CU height threshold,
        determining a number of non-zero transform coefficients for at least one CB in the CU, a size of each of the at least one CB being larger than or equal to a first threshold; and
        when the number of non-zero transform coefficients is less than a second threshold, determining that the secondary transform index is not signaled in the coding information.

3. The method of claim 2, wherein
    the coding information indicates that a color format for the CU is YUV 4:2:0;
    the CU includes a luma block and two chroma blocks; and
    the method further includes:
        determining whether a first dimension of the luma block is 4 and a second dimension of the luma block is N, N being larger than or equal to 4; and
        when the first and second dimensions are determined to be 4 and N, respectively, the determining the number of non-zero transform coefficients includes determining the number of non-zero transform coefficients from only the luma block, the at least one CB being the luma block.

4. The method of claim 2, wherein
the coding information indicates that a color format for the CU is YUV 4:2:2;
the CU includes a luma block and two chroma blocks; and
the method further includes:
   determining whether a size of the luma block is 4×N, N being larger than or equal to 4; and
   when the size of the luma block is determined to be 4×N, N and 4 being a height and a width of the luma block, respectively, the determining the number of non-zero transform coefficients includes determining the number of non-zero transform coefficients from only the luma block, the at least one CB being the luma block.

5. A method for video encoding, comprising:
determining whether a secondary transform is allowed based on a size of a coding unit (CU), a CU width threshold, and a CU height threshold, the CU width threshold and the CU height threshold being both less than a maximum transform unit (TU) size in the CU; and
encoding coding information of the CU in a coded video bitstream based on whether the secondary transform is determined to be allowed, the coding information indicating the size of the CU, wherein
when the size of the CU is less than or equal to the CU width threshold or the CU height threshold, the secondary transform is allowed and a secondary transform index for the secondary transform is signaled in the coding information.

6. The method of claim 5, further comprising:
when the size of the CU is less than or equal to the CU width threshold or the CU height threshold,
   determining a number of non-zero transform coefficients for at least one CB in the CU, a size of each of the at least one CB being larger than or equal to a first threshold; and
   when the number of non-zero transform coefficients is less than a second threshold, a secondary transform index is not signaled in the coding information.

7. The method of claim 6, wherein
a color format for the CU is YUV 4:2:0;
the CU includes a luma block and two chroma blocks; and
the method further includes:
   determining whether a first dimension of the luma block is 4 and a second dimension of the luma block is N, N being larger than or equal to 4; and
   when the first and second dimensions are 4 and N, respectively, the determining the number of non-zero transform coefficients includes determining the number of non-zero transform coefficients from only the luma block, the at least one CB being the luma block.

8. The method of claim 6, wherein
a color format for the CU is YUV 4:2:2;
the CU includes a luma block and two chroma blocks; and
the method further includes:
   determining whether a size of the luma block is 4×N, N being larger than or equal to 4; and
   when the size of the luma block is 4×N, N and 4 being a height and a width of the luma block, respectively, the determining the number of non-zero transform coefficients includes determining the number of non-zero transform coefficients from only the luma block, the at least one CB being the luma block.

9. A method of processing visual media data, the method comprising:
processing a bitstream of the visual media data according to a format rule, wherein
the bitstream includes coding information of a coding unit (CU), the coding information indicating a size of the CU, the CU including at least one chroma block; and
the format rule specifies that
   a maximum transform unit (TU) size in the CU is determined from the bitstream,
   a CU width threshold and a CU height threshold are both less than the maximum TU size,
   whether a secondary transform is allowed for the CU including the at least one chroma block is determined, and
   when the secondary transform is allowed and a secondary transform index for the secondary transform is signaled, the size of the CU is less than or equal to the CU width threshold or the CU height threshold.

10. The method of claim 9, further comprising:
when the size of the CU is less than or equal to the CU width threshold or the CU height threshold,
   determining a number of non-zero transform coefficients for at least one CB in the CU, a size of each of the at least one CB being larger than or equal to a first threshold; and
   when the number of non-zero transform coefficients is less than a second threshold, the format rule specifies that the secondary transform index is not signaled in the coding information.

11. The method of claim 10, wherein
the coding information indicates that a color format for the CU is YUV 4:2:0;
the CU includes a luma block and two chroma blocks; and
the format rule specifies that:
   whether a first dimension of the luma block is 4 and a second dimension of the luma block is N are determined, N being larger than or equal to 4, and
   when the first and second dimensions are 4 and N, respectively, the number of non-zero transform coefficients is determined from only the luma block, the at least one CB being the luma block.

12. The method of claim 10, wherein
the coding information indicates that a color format for the CU is YUV 4:2:2;
the CU includes a luma block and two chroma blocks; and
the format rule specifies that:
   whether a size of the luma block is 4×N is determined, N being larger than or equal to 4; and
   when the size of the luma block is 4×N, N and 4 being a height and a width of the luma block, respectively, the number of non-zero transform coefficients is determined from only the luma block, the at least one CB being the luma block.

* * * * *